US012602806B2

(12) United States Patent
Tao et al.

(10) Patent No.: US 12,602,806 B2
(45) Date of Patent: Apr. 14, 2026

(54) SYSTEMS AND METHODS FOR MACHINE VISION ROBOTIC PROCESSING

(71) Applicant: University of Maryland, College Park, College Park, MD (US)

(72) Inventors: Yang Tao, North Potomac, MD (US); Dongyi Wang, Fayetteville, AR (US); Mohamed Amr Ali, Lanham, MD (US)

(73) Assignee: University of Maryland, College Park, College Park, MD (US)

( * ) Notice: Subject to any disclaimer, the term of this patent is extended or adjusted under 35 U.S.C. 154(b) by 567 days.

(21) Appl. No.: 17/963,156

(22) Filed: Oct. 10, 2022

(65) Prior Publication Data

US 2023/0196599 A1 Jun. 22, 2023

Related U.S. Application Data

(60) Provisional application No. 63/414,881, filed on Oct. 10, 2022, provisional application No. 63/262,327, filed on Oct. 8, 2021.

(51) Int. Cl.
G06K 9/00 (2022.01)
B25J 9/16 (2006.01)
(Continued)

(52) U.S. Cl.
CPC ............. G06T 7/593 (2017.01); B25J 9/1697 (2013.01); G06V 10/141 (2022.01)

(58) Field of Classification Search
CPC .... G06V 10/141; G06V 10/143; G06V 10/82; G06V 2201/06; G02B 21/06;
(Continued)

(56) References Cited

U.S. PATENT DOCUMENTS

| 6,700,669 B1 * | 3/2004 | Geng | ...................... G01S 17/89 |
| | | | 356/610 |
| 12,046,010 B2 * | 7/2024 | Balthasar | ............... G06V 20/64 |

(Continued)

OTHER PUBLICATIONS

Yu, C., Chen, X., & Xi, J. (2017). Modeling and calibration of a novel one-mirror galvanometric laser scanner. Sensors, 17(1), 164. (Year: 2017).*

(Continued)

*Primary Examiner* — Gregory A Morse
*Assistant Examiner* — Kevin M Coomber
(74) *Attorney, Agent, or Firm* — Quarles & Brady LLP; Yakov S. Sidorin

(57) ABSTRACT

Systems, methods, and media for machine vision-guided robotic loading are provided. Such systems and methods can allow for more accurate object detection so as to allow for robotic picking or loading of an object from a pile or group of objects. In some embodiments, a camera is controlled to capture a background image of the object or group of objects. One or more illumination sources (such as, e.g., laser illuminators) are controlled to project immunization toward the object or group of objects within the field-of-view of the camera. The camera may be controlled to capture a scan image comprising the projected illumination. Based on the scan image, a depth map can be determined, which is provided to a machine learning model along with the background image. The output of the machine learning model can then provide information associated with one or more objects, such as location information, orientation information, and the like.

20 Claims, 12 Drawing Sheets

(51) Int. Cl.
  *G06T 7/593* (2017.01)
  *G06V 10/141* (2022.01)
(58) Field of Classification Search
  CPC .. G01N 21/8806; G01N 21/956; G06T 7/521;
      G06T 7/11; G06T 2207/20084; G06T
      7/593; G06T 7/55; G01B 11/2545; B25J
      9/1697; G05B 2219/45063; G05B
      2219/40053
  See application file for complete search history.

(56) References Cited

U.S. PATENT DOCUMENTS

| | | | |
|---|---|---|---|
| 2015/0224650 A1* | 8/2015 | Xu | B25J 9/1692 |
| | | | 414/730 |
| 2020/0070370 A1* | 3/2020 | Wakabayashi | B25J 9/1697 |
| 2020/0166333 A1* | 5/2020 | Zhou | G01B 11/2518 |
| 2021/0081791 A1* | 3/2021 | Goodrich | G06T 7/73 |

OTHER PUBLICATIONS

Je, C., Lee, K. H., & Lee, S. W. (2013). Multi-projector color structured-light vision. Signal Processing: Image Communication, 28(9), 1046-1058. (Year: 2013).*

Li, Y., Qu, X., Zhang, F., & Zhang, Y. (2020). Separation method of superimposed gratings in double-projector structured-light vision 3D measurement system. Optics Communications, 456, 124676. (Year: 2020).*

Biskup et al., A Stereo Imaging System for Measuring Structural Parameters of Plant Canopies, Plant, Cell and Environment, 2007, 30:1299-1308.

Cai et al., Measurement of Potato Volume with Laser Triangulation and Three-Dimensional Reconstruction, IEEE Access, 2020, 8:176565-176574.

Geng, Structured-Light 3D Surface Imaging: A Tutorial, Advances in Optics and Photonics, 2011, 3:128-160.

Horn, Shape From Shading: A Method for Obtaining the Shape of a Smooth Opaque Object From One View, Technical Report 232, MIT Artificial Intelligence Laboratory, 1970, 198 pages.

Lenz et al., Techniques for Calibration of the Scale Factor and Image Center for High Accuracy 3-D Machine Vision Metrology, IEEE Transactions on Pattern Analysis and Machine Intelligence, 1988, 10(5):713-720.

Mertz et al., A Low-Power Structured Light Sensor for Outdoor Scene Reconstruction and Dominant Material Identification, In 2012 IEEE Computer Society Conference on Computer Vision and Pattern Recognition Workshops, pp. 15-22.

Misimi et al., GRIBBOT—Robotic 3D Vision-Guided Harvesting of Chicken Fillets, Computers and Electronics in Agriculture, 2016, 121:84-100.

Vazquez-Arellano et al., 3-D Imaging Systems for Agricultural Applications—A Review, Sensors, 2016, 16:618, pp. 1-24.

Westoby et al., 'Structure-from-Motion' Photogrammetry: A Low-Cost Effective Tool for Geoscience Applications, Geomorphology, 2012, 179:300-314.

* cited by examiner 108-2                    102                108-1

114                            116

210

108

212

208

600

602
Acquire Background Image

604
Acquire Object Scan Set

606
Subtract Background Image

608
Separate Scan Sets

610
Subtract Baseline Scan Images

612
Determine Depth Map for Each Illumination Source

614
Merge Depth Maps

Depth Map

Top Priority & Orientation

Colored Image

Detection Results

SYSTEMS AND METHODS FOR MACHINE VISION ROBOTIC PROCESSING

CROSS-REFERENCE TO RELATED APPLICATIONS

This application is based on, claims priority to, and incorporates herein by reference in its entirety: U.S. Provisional Patent Application Ser. No. 63/262,327 filed Oct. 8, 2021, and entitled "MACHINE VISION GUIDED ROBOTIC LOADING AND PROCESSING ON MANUFACTURING LINES;" and U.S. Provisional Patent Application Ser. No. 63/414,881 filed Oct. 10, 2022, and entitled "SYSTEMS AND METHODS FOR MACHINE VISION ROBOTIC PROCESSING."

STATEMENT REGARDING FEDERALLY SPONSORED RESEARCH

This invention was made with government support under 20206701731191 awarded by the United States Department of Agriculture (USDA). The government has certain rights in the invention.

BACKGROUND

Robotic pick-and-place tasks are used in automated industrial lines. Using existing techniques, the operation generally requires prior knowledge of the localization, orientation, and orderly discretization of the products or items. Industrial lines for agriculture commodities are typically random and chaotic, for example, having items arrive in disordered piles. Thus, manual labor is often favored over automation in these cases. This, however, results in low throughput lines and can be laborious and even dangerous for operators. Depth imaging may be used to relay real-world, absolute depth information to mechanical systems for perception or manipulation of items. However, current depth imaging modalities, such as time-of-flight or stereoscopic imaging, are unsuitable for piled commodities because they suffer from low depth resolution, obstructed regions in the field-of-view, misalignment between colored images and depth information, limitations on the height of objects at the edge of the field-of-view, and insufficient depth range.

Accordingly, improved systems, methods, and media for the detection and manipulation of objects, for example, items on processing lines, are desirable.

SUMMARY

In accordance with some embodiments of the disclosed subject matter, systems, methods, and media for machine vision-guided robotic loading are provided.

For example, in some embodiments, a system can be provided, for detecting an object on a surface. Such systems may include a camera, wherein the camera is oriented with the surface in a field-of-view of the camera; a plurality of aimable illumination sources configured to project an illumination toward the surface within the field-of-view of the camera; and a controller configured to: control the camera to capture a background image of the object on the surface; control the plurality of aimable illumination sources to project illumination toward the surface; control the camera to capture a scan image comprising the projected illumination; determine a depth map based on the scan image; provide the depth map and the background image to a machine learning model; and receive an output from the machine learning model, wherein the output comprises information associated with the object.

In another aspect, the functions of the foregoing system may be implemented as a method. For example, a method may be provided comprising: controlling a camera to capture a background image of an object on a surface, wherein the camera is oriented with the surface in a field-of-view of the camera; controlling a plurality of aimable illumination sources to project illumination toward the surface and within the field-of-view of the camera; controlling the camera to capture a scan image comprising the projected illumination; determining a depth map based on the scan image; providing the depth map and the background image to a machine learning model; and receiving an output from the machine learning model, wherein the output comprises information associated with the object.

BRIEF DESCRIPTION OF THE DRAWINGS

The present disclosure will hereafter be described with reference to the accompanying drawings, wherein like reference numerals denote like elements.

DETAILED DESCRIPTION

In accordance with some embodiments of the disclosed subject matter, systems, methods, and media for machine vision assisted processing of items are provided. In particular, novel machine vision systems and methods are introduced to solve loading challenges and enable smart agricultural or other food manufacturing, but are not limited to these applications. The machine vision systems and methods described herein may be used in a variety of settings and configurations, for example in a variety of manufacturing, industrial, or other contexts.

Advantageously, systems and methods according to various embodiments of the present disclosure may provide profiling of concavities, convex areas, or other gaps in the field-of-view, and may reconstruct textured and untextured products while maintaining sub-millimeter resolution and reduced height limitations throughout the field-of-view. Further, machine vision systems and methods described herein allow scanning static industrial lines without the conveyor having to move, and may determine both a depth map and an image of the items that are properly aligned.

Figure 1:
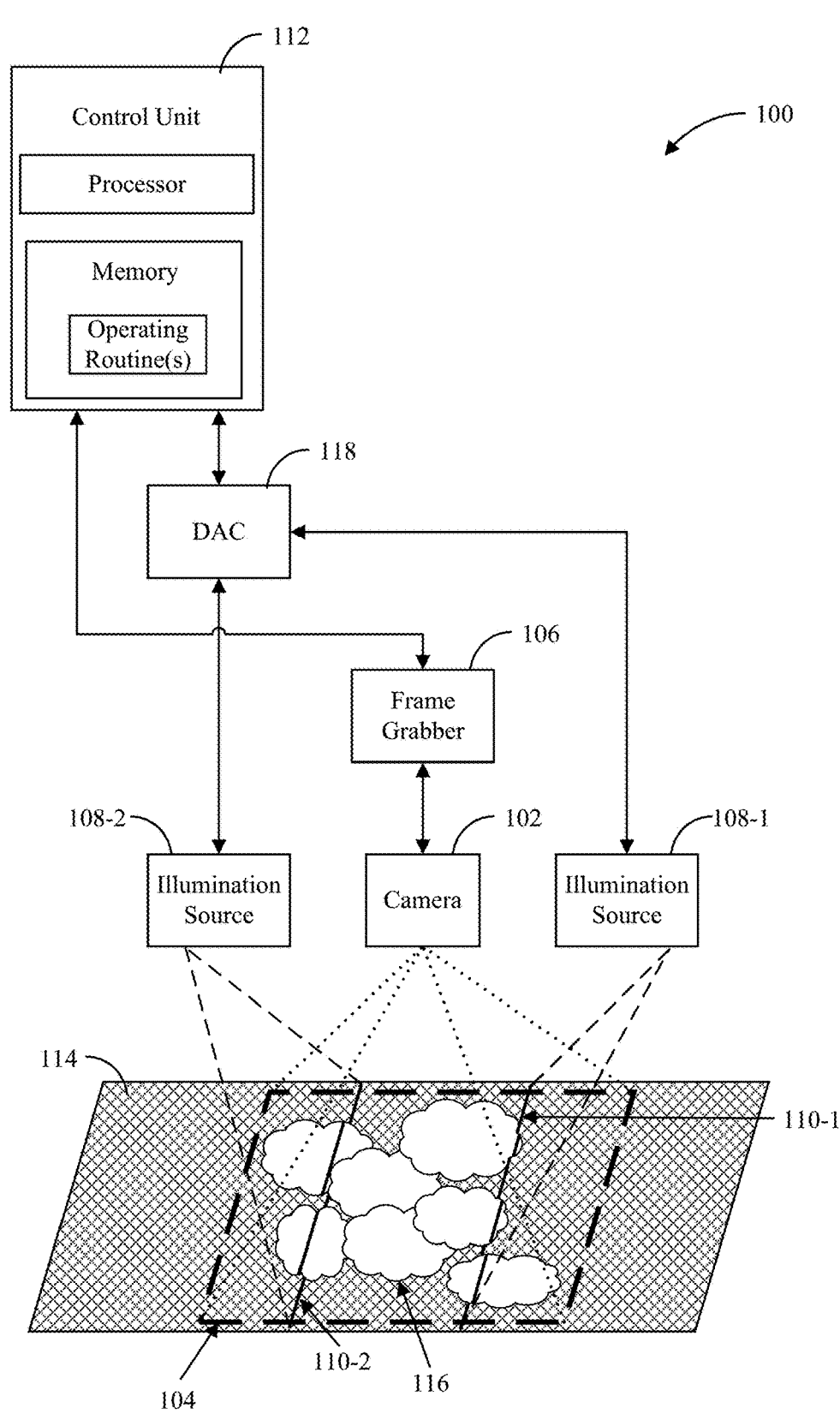
FIG. 1 illustrates an example machine vision system in accordance with an embodiment.

FIG. 1 shows an example of a system 100 that can be used to implement machine vision-guided decision making, for example to control robotic loading of items, according to some embodiments of the disclosed subject matter. The machine vision system 100 may comprise a camera 102 and a plurality of illumination sources 108 (e.g., 108-1, 108-2) communicatively coupled with a controller 112. The communicative coupling may comprise any suitable system or method for transmitting and/or receiving data and/or instructions, such as a wireless network, wired network, communication bus (serial or parallel), PCI Express®, USB®, Camera Link®, Ethernet, other standardized or custom communication interface, a current level, a voltage level, or the like.

As described herein, the controller 112 may be configured to send and/or receive information (e.g., including instructions and/or data) to/from the various components of the machine vision system 100. The controller 112 may comprise, for example, a processor, CPU, APU, GPU, microcontroller, application-specific integrated circuit, programmable gate array, and the like, any other digital and/or analog components, as well as combinations of the foregoing (whether distributed, networked, locally connected, or the like), and may further comprise inputs and outputs for receiving and providing control instructions, control signals, drive signals, power signals, sensor signals (e.g., sensor output), digital signals, analog signals, and the like. All such computing devices and environments are intended to fall within the meaning of the term "controller," "control unit," "processor," "processing device," or "processing circuitry" as used herein unless a different meaning is explicitly provided or otherwise clear from the context. In some examples, the controller 112 may comprise one or more such processor devices.

The controller 112 may comprise processing circuitry configured to execute operating routine(s) stored in a memory. The memory may include any suitable volatile memory, non-volatile memory, storage, any other suitable type of storage medium, or any suitable combination thereof. For example, the memory may include RAM, ROM, EEPROM, one or more flash drives, one or more hard disks, one or more solid state drives, one or more optical drives, etc. In some embodiments, the memory may have encoded thereon a computer program for controlling operation of the controller 112, DAC 118, camera 102, frame grabber 106, illumination sources 108, an electronic manipulator (e.g., configured to pick up, drop off, and/or move an object 116), and/or the like. In some embodiments, the operating routine(s) may comprise firmware.

The camera 102 may comprise any suitable device for capturing an image or video, for example a CMOS image sensor, CCD image sensor, other digital or analog imager, camera module, camera system, or the like. The camera 102 may capture images and/or video in any suitable wavelength or range of wavelengths, for example visible light, infrared, and the like. The camera 102 may be configured to receive control instructions and to provide the captured image and/or video over a communication interface. In some embodiments, the camera 102 may be configured to receive an instruction to capture an image or video (hereinafter referred to as a "trigger"). The camera 102 may provide the captured image and/or video (e.g., video stream) via its communication interface. In some configurations, more than one camera may be utilized. For example multiple cameras may be positioned along a conveyor belt to capture a composite image of a longer field of view. In other embodiments a camera may be associated with each laser source. In some embodiments, the objects of interest may be moving, while the laser sources remain fixed or having a limited sweep—thus, multiple cameras along a path of movement of the objects can be utilized to create composite images.

In some embodiments, the controller 112 may trigger the camera 102 and may receive the captured image and/or video directly from the camera 102. In some embodiments, the controller 112 may be communicatively coupled with a frame grabber 106, and the frame grabber 106 may be communicatively coupled with the camera 102. The frame grabber 106 may comprise any suitable device configured to receive the captured output of the camera 102 and convert it to a still image, for example in response to a trigger. In some embodiments, the frame grabber 106 may continuously receive video output from the camera 102. In some embodiments, the controller 112 may trigger the frame grabber 106, the frame grabber 106 may determine a still image from the camera 102 output in response to the trigger, and the controller 112 may then receive the image from the frame grabber 106. In some embodiments, controller 112 or camera 102 may comprise a frame grabber 106. As used herein, triggering the camera 102 may refer to triggering the frame grabber 106.

In some embodiments, the illumination source 108 may comprise any suitable optical device configured to produce light. The light may be of any suitable frequency(ies) or a specific frequency, for example visible light such as red, green, or blue, non-visible light such as infrared or ultraviolet, or the like. In some embodiments, each of the illumination sources 108 may be configured to produce a different frequency(ies) of light as compared to the other illumination source(s) 108. In some embodiments, the illumination source 108 may comprise any suitable device configured to project a defined pattern of light. For example, in some embodiments, the illumination source 108 may comprise a laser and may be configured to project a laser line, a plurality of laser lines, a laser grid, or the like. In an embodiment, the illumination sources 108 comprise a first illumination source 108 configured to project a green laser line and a second illumination source 108 configured to project a red laser line.

In some embodiments, the camera 102 may be chosen to be sensitive to the frequency of the illumination sources 108 and/or the frequencies reflected (or refracted) by the surfaces or objects the projected light may be aimed at. In some embodiments, the frequencies of the illumination sources 108 may be chosen based on the surfaces or objects that are intended to be illuminated by the projected light. For example, certain objects may readily absorb certain frequencies, and in some cases it may be desirable to avoid using an illumination source 108 having such a frequency.

In some embodiments, the illumination source 108 may comprise an aimable illumination source. The aimable illumination source may comprise any suitable device configured to project light at a selectable location. In some embodiments, the illumination source 108 may comprise a laser aimed at a controllable movable mirror, for example a mirror mounted to a controllable motor, controllable actuator, or the like. Referring briefly to FIG. 2B, in an exemplary embodiment the illumination source 108 may comprise a laser 208 aimed at a mirror 210 coupled with a galvanometer 212. In other embodiments, the illumination source 108 may be mounted on an arm or gantry to be moved about objects of interest. The galvanometer 212 may be configured to receive any suitable control input, for example a voltage level, current level, other analog or digital input, or the like, and rotate based on the received input. In some embodiments, the galvanometer 212 may be configured to receive an analog voltage input between –10V/+10 Volts into a motor driver. In some embodiments, the motor driver may control a motor to the appropriate position. In some embodiments, the light source itself (e.g., a laser) may be movably mounted.

In some embodiments, the controller 112 may directly control each illumination source 108 by sending the appropriate control signal to the illumination source. In some embodiments, the controller 112 may be communicatively coupled with a device configured to control one or more illumination sources 108. For example, the controller 112 may be communicatively coupled with a digital-to-analog controller (DAC) 118 and the DAC 118 may be communicatively coupled with each illumination source 108. The DAC 118 may be configured to receive digital control information from the controller 112 and convert it to an analog output configured to control the illumination sources 108. In some embodiments, the DAC 118 may be configured to output an individual analog output for each illumination source 108. In an exemplary embodiment, each illumination source 108 may comprise a galvanometer controllable via a voltage level on an input (e.g., each predetermined voltage level step rotates the galvanometer axis a predetermined amount), and the DAC 118 may be configured to output a voltage level to each of the illumination sources 108 based on the control information received from the controller 112. In some embodiments, the DAC 118 may be communicatively coupled with the frame grabber 106 or camera 102 and configured to provide the trigger signal to the frame grabber 106 or camera 102, for example based on control information received from the controller 112. In some embodiments, controller 112, frame grabber 106, or illumination sources 108 may comprise a DAC 118.

Referring still to FIG. 1, in some embodiments, the machine vision system 100 may be arranged such that the camera 102 and plurality of illumination sources 108 are oriented toward a surface 114. For example, the illumination sources 108 may be oriented to project light toward the surface 114, and the field-of-view (FOV) 104 of the camera 102 may include the surface 114 and/or objects 116 located on the surface 114. The surface 114 may comprise any suitable surface on which one or more objects to be imaged may be placed. In some embodiments, the surface may be flat. In some embodiments, the surface may have contours. For example, the surface 114 may comprise a conveyor belt, a food-contact surface such as stainless steel table, a container, packaging configured for the objects, other industrial line surface, or the like. The objects 116 may be generally one-dimensional (1D), two-dimensional (2D), or three-dimensional. In some embodiments, the surface 114 may contain only one object 116, a plurality of non-overlapping (as viewed from the camera 102) objects 116, or a plurality of objects 116 that may overlap.

In some embodiments, the machine vision system 100 may comprise two or more illumination sources 108. In some embodiments, the number and placement of the illumination sources 108 may be chosen based on the desired level of reduction in the anticipated gaps in the field of view, which may vary depending on the type, quantity, piling characteristics, and the like of the object to be scanned. Each illumination source 108 may be strategically placed to image regions that may reasonably be missed by another illumination source 108. In some embodiments, the machine vision system 100 may comprise two illumination sources 108, for example arranged at opposite sides of the FOV 104. In some embodiments, the machine vision system 100 may comprise three illumination sources, for example placed at 120 degree intervals. In some embodiments, the machine vision system 100 may comprise four illumination sources 108, for example two pairs of illumination sources, each pair having one illumination source 108 arranged at an opposite side of the FOV 104 from the other illumination source 108, and a first pair arranged perpendicular to the second pair with respect to the FOV 104 (e.g., the four illumination sources forming a rectangle about the FOV 104. In other embodiments, only a single illumination source may be used, while the objects of interest are moved or rotated; or the illumination source itself can be moved about the objects of interest. It is to be understood that the number of illumination sources and their relative position with respect to one another and the objects of interest can be adapted to account for how the objects of interest are loaded into the camera's field of view (e.g., in processing facilities, objects may be dumped into symmetric piles, or may slide down conveyors such that they are arranged in slanted piles, can be driven upwards, etc.—for each likely pile shape, and shape of the objects of interest, a positioning of the illumination source(s) can be set).

The FOV 104 of the camera 102 may comprise a 3D volume, as illustratively represented by the pyramidal shape outlined by the dashed box and dotted lines in FIG. 1. As also representatively illustrated in FIG. 1, the illumination source 108-1, 108-2 may comprise a line, such as a line laser, projected toward the surface 114. The illumination sources 108 may be arranged to project light into the FOV 104 of the camera 102. The projected illumination 110-1, 110-2 (from illumination sources 108-1, 108-2, respectively) may intersect with the one or more objects 116 present on the surface 114. The camera 102 may be configured to capture an image and/or video of the projected illumination 110 intersecting with the surface 114 and/or objects 116 located on the surface 114. In some embodiments, a first projected light 110-1 may comprise a different color than a second projected light 110-2, for example created from a red laser and a green laser.

In some embodiments, the illumination sources 108 may be configured to scan or sweep illumination across the FOV 104 of the camera 102, for example as controlled by the controller 112. For example, the illumination sources 108 may be configured to scan illumination across a predefined area of the surface 114 that appears in the FOV 104. The predefined area may cover the entire FOV 104 or a subset thereof. In some embodiments the illumination sources 108 may project laser lines and may scan the projected laser line across the surface, for example in a predetermined number of steps. The projected light may intersect with the surface 114 and objects 116 at each scan step, and such intersection of the projected light may be imaged by the camera 102 at each scan step. Scan step determination is described in further detail below.

Figure 2A:
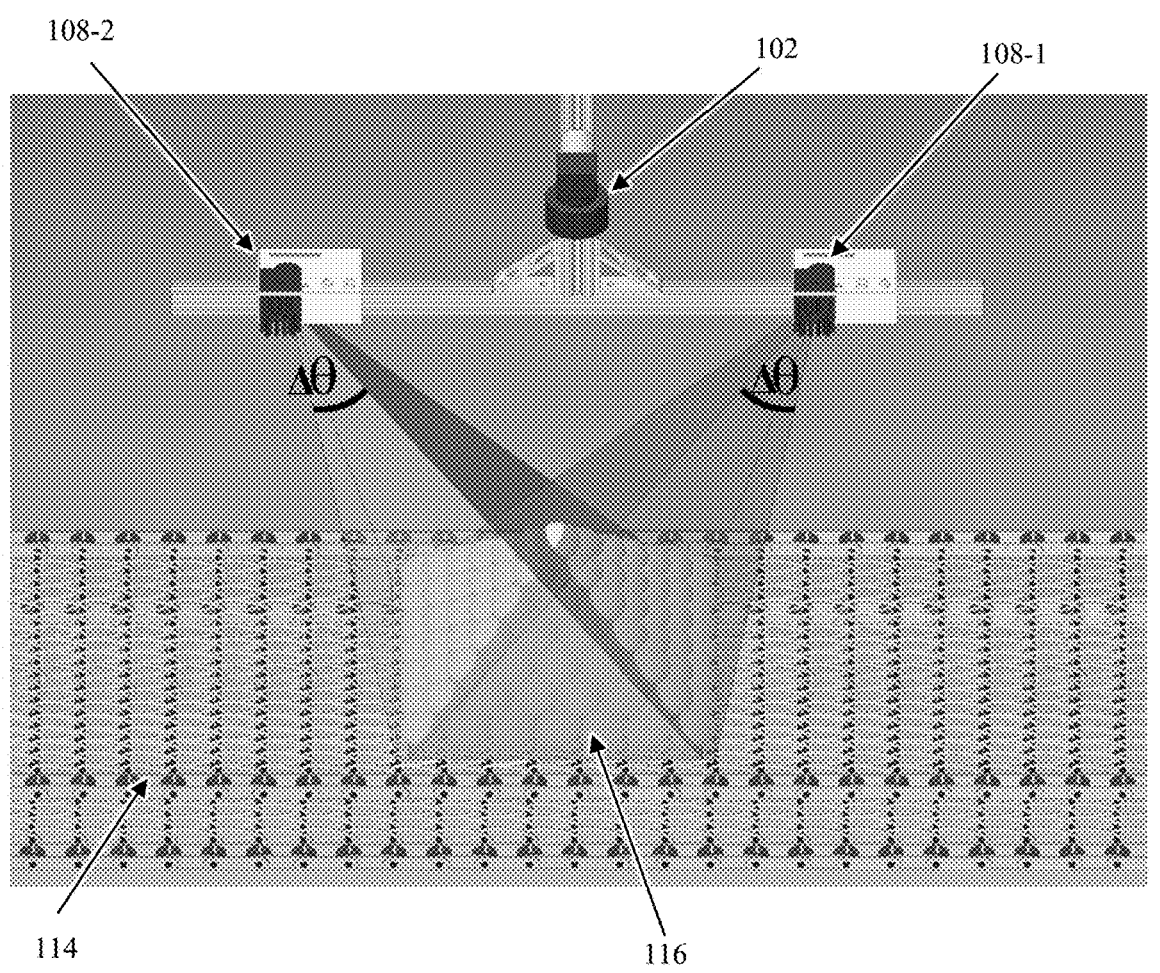
FIG. 2A illustrates an example arrangement of a machine vision system in accordance with an embodiment.
Figure 2B:
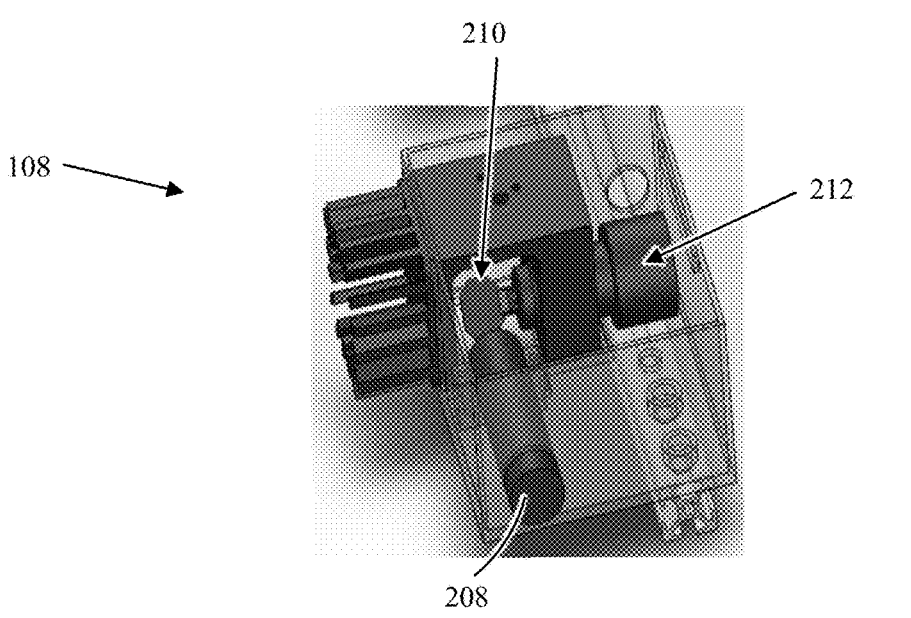
FIG. 2B illustrates an illumination source in accordance with an embodiment.

The entire volume of projected light from each illumination source 108, combined from all scan steps (or the entire sweep), is illustratively represented in FIG. 2A. The range of the scan may be represented in FIG. 2A by the change in angle (e.g., AO) between the first scan step and the last scan step (or the beginning of the sweep and end of the sweep) for an illumination source 108. In some embodiments, the change in angle may be the same for each of the plurality of illumination sources 108. In some embodiments, each of the plurality of illumination sources may have a change in angle independent of the other illumination sources.

Figure 11:
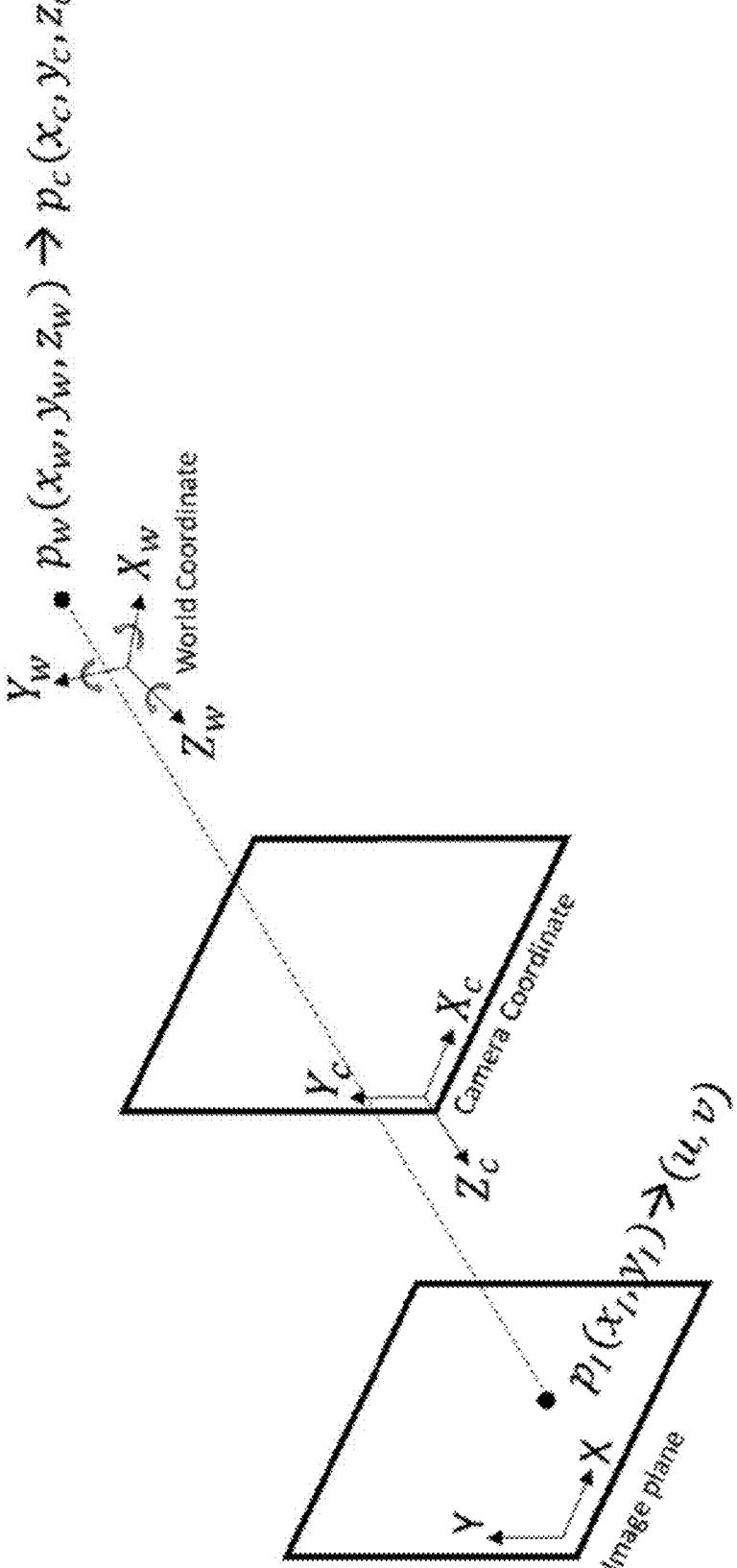
FIG. 11 illustrates a pinhole camera model in accordance with an embodiment.

In some embodiments, camera calibration may be performed to determine a transform of pixel positions in the coordinate system of the image captured by the camera 102 to the real-world (W) coordinate system. As will be described in more detail below, such a transform may be used to determine world position and height of an object 116 based on the captured image. Referring to FIG. 11, in some embodiments, a pinhole camera model may be used to determine the transform. The pinhole camera model may consider two transformation matrices (extrinsic and intrinsic). A point in the world coordinate system is denoted as $p_w(x_w, y_w, z_w)$. The extrinsic matrix model transforms the point $p_w$ into the camera lens coordinate system $p_c(x_c, y_c, z_c)$ through:

$$\begin{bmatrix} x_c \\ y_c \\ z_c \end{bmatrix} = R \begin{bmatrix} x_w \\ y_w \\ z_w \end{bmatrix} + T, \qquad \text{(Eq. 1)}$$

where R is a 3×3 rotational matrix $$\begin{bmatrix} r_{11} & r_{12} & r_{13} \\ r_{21} & r_{22} & r_{23} \\ r_{31} & r_{32} & r_{33} \end{bmatrix}$$

and T is a 3×1 translational matrix $$\begin{bmatrix} t_1 \\ t_2 \\ t_3 \end{bmatrix}.$$

The intrinsic matrix projects the point $p_c$ to the 2D image plane $p_I(x_I, y_I)$ (e.g., image sensor plane) which is finally transformed to the pixel position value. The computation of $p_I$ follows the basic geometric principles shown in Eq. 2, where f is the focal length of the lens of the camera 102:

$$\begin{bmatrix} x_I \\ y_I \\ 1 \end{bmatrix} = \begin{bmatrix} \dfrac{f}{z_c} & 0 & 0 & 0 \\ 0 & \dfrac{f}{z_c} & 0 & 0 \\ 0 & 0 & \dfrac{1}{z_c} & 0 \end{bmatrix} \begin{bmatrix} x_c \\ y_c \\ z_c \\ 1 \end{bmatrix}. \qquad \text{(Eq. 2)}$$

The pixel value (u, v) can be computed based on the physical position of $p_I$, whose scaling factors are represented as $$\left( \frac{1}{dx}, \frac{1}{dy} \right)$$

in x and y directions. $\theta_{xy}$ is used to compensate for the angle between the actual x and y directions of the image plane coordinate system which may not be perfectly perpendicular. $(u_0, v_0)$ models pixel shifts between the actual and ideal origins of the coordinate systems. The mathematical description is:

$$\begin{bmatrix} u \\ v \\ 1 \end{bmatrix} = \begin{bmatrix} \dfrac{1}{dx} & \dfrac{-\cot\theta_{xy}}{dy} & u_0 \\ 0 & \dfrac{1}{dy\sin\theta_{xy}} & v_0 \\ 0 & 0 & 1 \end{bmatrix} \qquad \text{(Eq. 3)}$$

$$\begin{bmatrix} x_I \\ y_I \\ 1 \end{bmatrix} = \begin{bmatrix} \dfrac{f}{dx} & \dfrac{-f\cot\theta_{xy}}{dy} & u_0 \\ 0 & \dfrac{f}{dy\sin\theta_{xy}} & v_0 \\ 0 & 0 & 1 \end{bmatrix} \begin{bmatrix} \dfrac{x_c}{z_c} \\ \dfrac{y_c}{z_c} \\ 1 \end{bmatrix} = M_I \begin{bmatrix} x_n \\ y_n \\ 1 \end{bmatrix},$$

where $M_I$ represents the intrinsic matrix and $(x_n, y_n)$ are normalized point positions in the camera lens coordinate system.

In some embodiments, lens distortion may be computed for high accuracy calibration. Various aberrations may be accounted for, for example chromatic, coma, astigmatism, and the like. In some embodiments, radial and tangential distortions may be considered, as shown by:

$$\begin{bmatrix} x_{nd} \\ y_{nd} \end{bmatrix} = \left(1 + k_1 r^2 + k_2 r^4 + k_3 r^6\right) \begin{bmatrix} x_n \\ y_n \end{bmatrix} + \qquad \text{(Eq. 4)}$$

$$\begin{bmatrix} 2p_1 x_n y_n + p_2\left(r^2 + 2x_n^2\right) \\ p_1\left(r^2 + 2y_n^2\right) + 2p_2 x_n y_n \end{bmatrix},$$

where $k_1$, $k_2$ and $k_3$ model the radial distortions, $p_1$ and $p_2$ model the tangential distortions, and $(x_{nd}, y_{nd})$ are the position values after point distortion adjustment. These parameters may be determined using any suitable method. For example, in some embodiments, these parameters may be estimated based on multiple chessboard images with a suitable iterative linear regression algorithm. In some embodiments, the origin of the world coordinate system may be pre-marked.

Given the pixel position (u, v), $(x_{nd}, y_{nd})$ may be computed according to:

$$\begin{bmatrix} x_{nd} \\ y_{nd} \\ 1 \end{bmatrix} = M_I^{-1} \begin{bmatrix} u \\ v \\ 1 \end{bmatrix}. \qquad \text{(Eq. 5)}$$

In some embodiments, to simplify the process of $(x_n, y_n)$ computation, the value of r could be approximated as $$\sqrt{x_{nd}^2 + y_{nd}^2}.$$

In some embodiments, tangential distortion and high degree radial distortion may also be ignored which may lead to a small (e.g., <0.1) pixel error in some embodiments. The ($x_n$, $y_n$) may be approximated using:

$$\begin{bmatrix} x_n \\ y_n \end{bmatrix} \approx \frac{1}{1 + k_1\left(x_{nd}^2 + y_{nd}^2\right)}\begin{bmatrix} x_{nd} \\ y_{nd} \end{bmatrix}. \quad \text{(Eq. 6)}$$

In some embodiments, the corresponding world coordinates of pixel value (u, v) may be computed from:

$$\begin{bmatrix} x_n \\ y_n \\ 1 \end{bmatrix} = \frac{1}{z_c}\begin{bmatrix} x_c \\ y_c \\ z_c \end{bmatrix} = \frac{1}{z_c}\left(R\begin{bmatrix} x_w \\ y_w \\ z_w \end{bmatrix} + T\right), \quad \text{(Eq. 7)}$$

where $z_c$ may be estimated with $x_w=0$ and $y_w=0$, and $z_c \approx r_{33}z_w + t_3$. In some embodiments, when $z_w$ is known, ($x_w$, $y_w$) may be symbolically expressed as the following (with lens distortion effects corrected):

$$\begin{bmatrix} x_w \\ y_w \end{bmatrix} = \begin{bmatrix} r_{11} & r_{12} \\ r_{21} & r_{22} \end{bmatrix}^{-1}\begin{bmatrix} z_c x_n - t_1 - z_w r_{13} \\ z_c y_n - t_2 - z_w r_{23} \end{bmatrix}. \quad \text{(Eq. 8)}$$

In an exemplary experimental setup, the following values were determined:

$$k_1 = -0.2230,$$

$$M, = \begin{bmatrix} 4.38 * 10^3 & 0 & 468.57 \\ 0 & 4.39 * 10^3 & 521.23 \\ 0 & 0 & 1 \end{bmatrix}, \text{ and}$$

$$[R|T] = \begin{bmatrix} 1.00 & -6.70 * 10^{-3} & -290 * 10^{-3} & -78.92 \\ 6.72 * 10^{-3} & 1.00 & 6.55 * 10^{-3} & -57.69 \\ -2.85 * 10^{-3} & 6.57 * 10^{-3} & -1.00 & 890.96 \end{bmatrix},$$

and the real world coordinates ($x_w$, $y_w$) therefore determined according to $$\begin{bmatrix} x_w \\ y_w \end{bmatrix} = \begin{bmatrix} 2.03 * 10^{-1}u + 1.22 * 10^{-3}v + 1.11 * 10^{-1}z_w - 2.28 * 10^{-4}uz_w - \\ 1.36 * 10^{-6}vz_w - 16.6 \\ 2.03 * 10^{-1}v + 1.30 * 10^{-3}u + 1.11 * 10^{-1}z_w - 1.46 * 10^{-6}uz_w - \\ 2.27 * 10^{-4}vz_w - 47.9 \end{bmatrix}.$$

Figure 3:
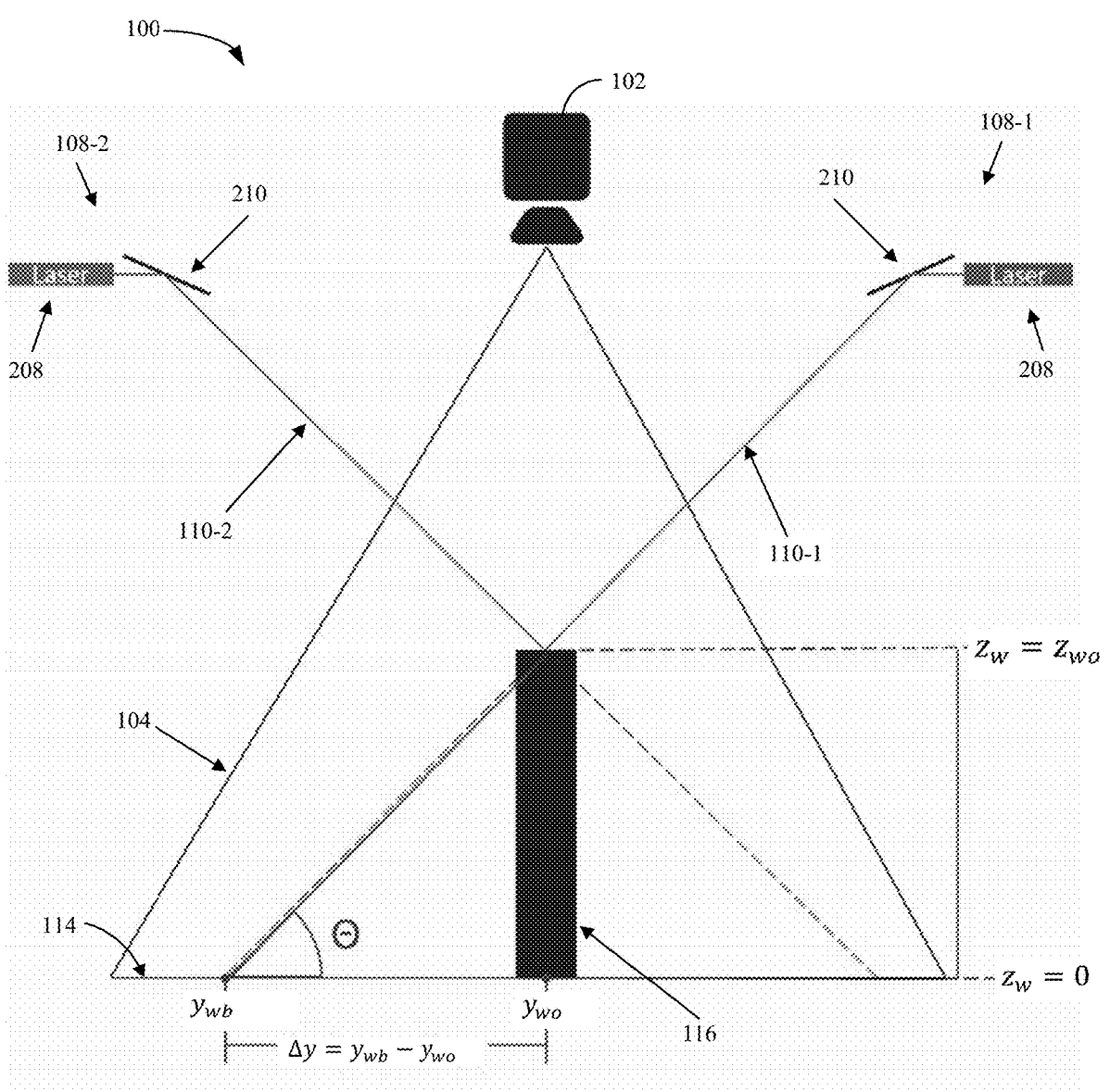
FIG. 3 illustrates a side view of a machine vision system in accordance with an embodiment.

Referring to FIG. 3, in some embodiments, the intersection of the projected illumination 110 with an object 116 may be used by the controller 112 or other suitable computing device to determine the real-world height of the object 116. In some embodiments, the real-world shift of the projected light as it intersects the object 116 as compared to where the projected light would intersect the surface 114 if the object 116 were not present (as determined based on the shift in image pixel positions using the equations described above), may be used to determine the object height. As described in more detail below, the term "baseline" may be used to describe the illumination projection intersecting the surface 114 instead of an object 116 on the surface 114.

In some embodiments, the projected illumination may comprise a line laser. In some embodiments, calculations may be simplified by configuring the line to project to $y=y_{wb}$, parallel to $X_w$, the x-axis of the world coordinate system. In some embodiments having opposing illumination sources 108, the y-axis of the world coordinate system may be defined in the direction between the two illumination sources 108 and along the surface 114, and the x-axis of the world coordinate system may be defined perpendicular to the y-axis and also along the surface 114.

The relationship between the shifted y-value ($\Delta y$) and the height of the object 116 ($z_{wo}$), with the angle between the laser line projection and $Y_w$ axis denoted as $$\theta\left(0 \le \theta \le \pi, \ \theta \ne \frac{\pi}{2}\right),$$

is given by $z_{wo}=(y_{wb}-y_{wo})\tan \theta$ (Eq. 9). Therefore, the shifts in y-value of the projected light 110 as it intersects one or more objects 116 may be captured in one or more images by the camera 102 (as further described below), and the shifts may then be converted to a real-world height value of the object(s) using the method described above.

In some embodiments, the theoretical 3D imaging resolution may be estimated by:

$$\text{resolution} = \left| \frac{z_{wo}}{v_b - v_o} \right|$$

(Eq. 10). The resolution is determined by the illumination projection angle $\theta$. A smaller $\theta$ leads to better imaging resolution, but also limits the maximum height which can be measured. In some embodiments, the illumination projection angle $\theta$ may be controlled by the illumination sources 108, for example by galvanometers 212 based on control input from the controller 112.

Figure 4:
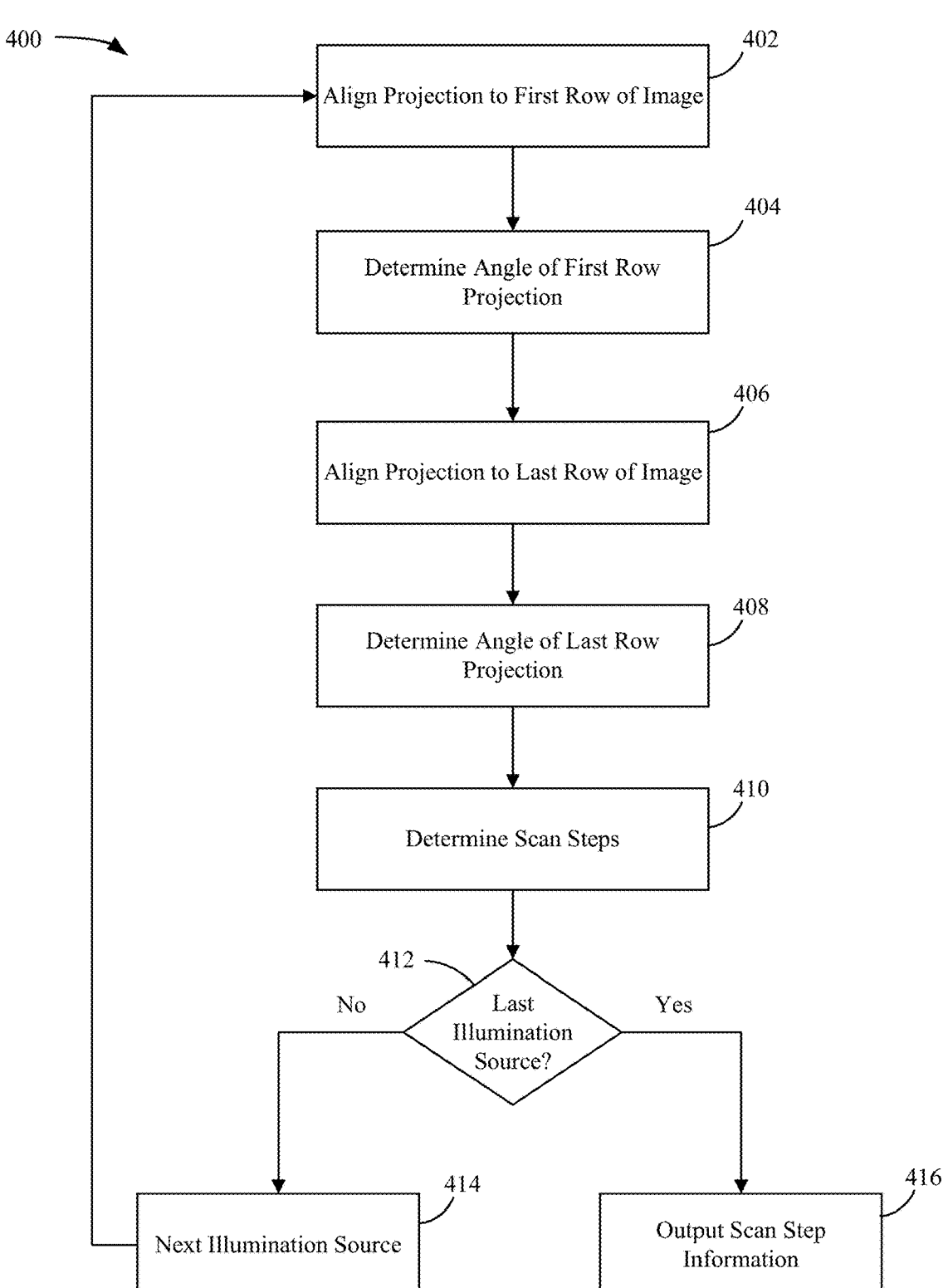
FIG. 4 illustrates a method for calibrating an illumination scan in accordance with an embodiment.

Referring to FIG. 4, a method for calibrating an illumination scan may comprise determining the maximum extents of the projection of each illumination source 108 in the field of view of the camera 102, determining settings that project the illumination source 108 at a first and a last extent of the field of view 104 (e.g., in the direction of scanning the illumination source), determining a number of illumination steps in between the first and last extent, and determining a setting for each of the steps. Alignment and positioning of the illumination source 108 and its projection 110 may be accomplished in any suitable manner, for example through a controller 112 or other computerized interface. In some embodiments, the illumination scan calibration method 400 may be implemented in the controller 112, for example, as operating routines stored in memory (e.g., as software).

In some embodiments, at step 402, a projection 110 from a first aimable illumination source 108 is aligned with a first edge of the image viewable by the camera 102, for example a first pixel row of the image. In some embodiments, each pixel row of the image may be parallel to $X_w$. In some embodiments, the projection 110 may comprise a laser line. The laser line may be created in any suitable manner, for example from a line laser, laser point source using optics, one-dimensional scanning of the laser source, or the like. The laser line may be projected onto the surface 114 and parallel to the first pixel row. In an alternative embodiment, an image smaller than the entire field of view of the camera may be defined (e.g., boundaries of the camera 102 field of view 104 ignored) and the projection 110 aligned according to the defined image.

At step 404, a first setting associated with aiming of the illumination source 108 is determined. In some embodiments, an aimable illumination source 108 comprises a fixed laser source 208 and a galvanometer 212 coupled with a mirror 210, and the setting may comprise a voltage input, a current input, or other setting to the galvanometer 212 to cause it to rotate the mirror 210 to the position desired to project the laser 208 line at the first edge of the image.

At step 406, a projection from the first aimable illumination source 108 is aligned with a second edge of the image viewable by the camera 102 (or an edge of a smaller defined image in some embodiments), for example at and parallel with the last pixel row of the image. At step 408, a second setting associated with aiming of the illumination source 108 is determined. In some embodiments, the setting may comprise a voltage input, a current input, or other setting to the galvanometer 212 to cause it to rotate the mirror 210 to the position desired to project the laser line at the second edge of the image.

At step 410, intermediate scan steps (between the first and second positions determined in steps 402 and 406, respectively) are determined, which may comprise determining the intermediate positions of the aimable illumination source 108, determining settings associated with the intermediate scan steps, or the like. The number of scan steps may be predetermined, for example 75 scan steps, 250 scan steps, 350 scan steps, 1000 scan steps, or the like, and the total number of scan steps may include the projections 110 or steps 402 and 406 (e.g., a total of 350 scan steps may comprise 348 intermediate scan steps and the two scans at each extent). In some embodiments, the intermediate laser projection positions are computed, for example by controller 112, based on linear interpolation with discrete scan steps. Information associated with the determined intermediate scan steps, for example the determined settings, may be stored in a memory such as the controller 112 memory for later use in scanning processes.

The steps 402 to 410 may be repeated 412 for each aimable illumination source 108. For example, at step 412, a check may be performed to determine if all illumination sources 108 have had their scans calibrated. If not, then a next illumination source 108 is chosen 414 and steps 402 to 410 are repeated for the chosen illumination source 108. Once all illumination sources have had their scans calibrated, then the illumination scan calibration method 400 is complete 416. The determined scan steps for a first illumination source 108 may not be the same as the determined scan steps for a second illumination source 108. For example, if a first illumination source 108 scans starting at a first row of the camera field of view and the second illumination source 108 scans starting at the last row of the camera field of view, the illumination sources 108 will scan in opposite directions (e.g., one left-to-right and the other right-to-left).

Figure 5:
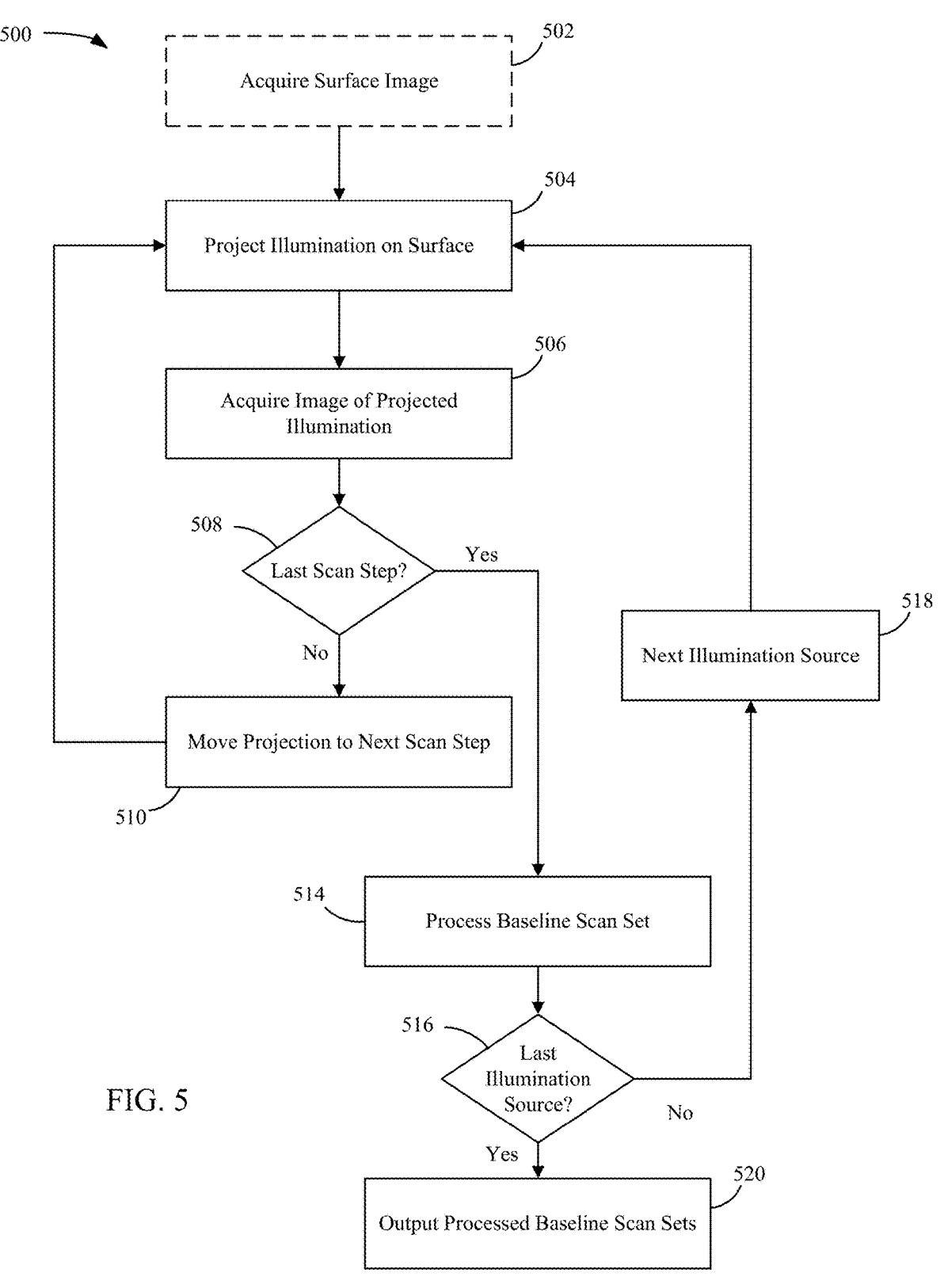
FIG. 5 illustrates a method for acquiring baseline scans in accordance with an embodiment.

Referring to FIG. 5, a method for acquiring baseline scans 500 may comprise acquiring an image of the projection 110 of each illumination source 108 on the surface 104 (without objects 116 present) at each scan position for the illumination source (scan steps). In some embodiments, the baseline scan acquisition method 500 may be implemented in the controller 112, for example, as operating routines stored in memory (e.g., as software). In some embodiments, the baseline scan acquisition method 500 may be run in conjunction with (e.g., part of) the illumination scan calibration method 400, such that the baseline scan step images are acquired in connection with determining the respective scan steps.

In some embodiments, the camera 102 may be triggered, for example by controller 112, to capture an image of the empty surface 114 at step 502. In some embodiments, a material may be placed on the empty surface 114 to enhance the quality of the acquired images, facilitate removal of the background/surface in further processing steps, or the like. For example, a black sheet of paper or other flat material may be placed on the surface prior to acquiring images, which may be more easily processed during any image processing steps. Further, in some embodiments, the surface 114 may comprise an uneven surface such as a conveyor, and the material facilitates determining a baseline height for the surface 114. As noted previously, the surface 114 may be considered height Z=0 in real-world coordinates. In some embodiments, in view of the sub-millimeter resolution provided by the systems and methods described herein, any material placed onto the surface for baseline imaging purposes may be chosen to have a thickness of a small fraction of a millimeter to reduce height calculation errors, or a known thickness of the material may be accounted for during later height calculation steps.

In some embodiments, an illumination source 108 may be projected onto the surface 114 at one of the scan steps determined for the illumination source 108, at step 504. In some embodiments, the camera 102 may then be triggered to capture an image of the illumination projection 110 at step 506. If images for all scan steps for an illumination source have not yet been acquired, as checked at step 508, then the aimable illumination source 108 may be controlled to project its illumination at the next scan step at step 510. Steps 504 to 510 may be repeated until images of all scan steps for an illumination source 108 have been acquired (the complete set of such images being referred to herein as a "baseline scan set" for an illumination source). The baseline scan set for the illumination source may be stored in memory.

In some embodiments, as each image is acquired, or after a subset or an entire set of images is acquired (e.g., a baseline scan set for a particular illumination source), the images may be processed using image processing operations at step 514 to leave only the projected illumination 110. For example, after images of all scan steps for an illumination source 108 have been acquired, each image of the baseline scan set may be processed 514 to remove noise and/or other extraneous information to leave only information related to the illumination projection 110. In some embodiments, after processing at step 514, each image may contain a solid color background (e.g., black, white, gray, blue, etc.) and an image of the projected illumination 110. In some embodiments, the baseline scan sets may comprise binary color information. For example, each image may be, after processing 514, entirely black except for the pixels that captured the projected illumination 110, which may for example represent a laser line of a particular color. In these embodiments, the pixels that captured the projected illumination 110 may retain the color information of projected illumination 110, or may be converted to another color, e.g., white. A baseline scan set that has been processed 514 (if necessary) to contain an accurate representation of the projected illumination 110 on the surface 114 is referred to herein as a "baseline scan mask set."

In some embodiments, the image of the empty surface 114 taken in step 502 may be subtracted from each of the images of the baseline scan set at step 514, thereby removing the features of the surface (color, shapes, textures, imperfections, and the like) from each of the images of the baseline scan set. In some embodiments, for example if the surface 114 comprises a uniform black material or such a material is placed on the surface, the background subtraction may not need to be performed and image processing 514 may not need to be performed and/or basic image enhancement (noise, contrast, sharpness, etc.) may be sufficient. In such cases the background image (step 502) may not be used.

In some embodiments, if images for all scan steps for all illumination sources have not yet been acquired, as checked at step 516, then the next illumination source 108 may be selected at step 518 for imaging according to steps 504 to 514. In some embodiments, the projected scan steps of a plurality of illumination sources 108 may be imaged at the same time (e.g., two illumination sources scanned in opposite directions, each image capturing the illumination projections 110 from the two illumination sources). Once all scan steps for all illumination sources 108 have been processed 514 (if necessary), then the method for acquiring baseline scans 500 may, at step 520, store in memory or otherwise output the baseline scan mask sets for each of the illumination sources. As will be recognized, storing or outputting of such images may happen at any time during the method for acquiring baseline scans 500.

Advantageously, with a sufficiently fast camera (e.g., 300, 400, 500, or 1000 or more frames-per-second) and illumination source 108 actuator (or motor or the like), and depending on the number of scan steps (e.g., 350), in some embodiments it may take less than one second to determine 500 a complete baseline scan set for each illumination source. For example, in some embodiments, the different wavelength lasers (e.g., red and green) can sweep simultaneously in parallel, such that a camera can capture the sweeps of both lasers of each step of sweeping simultaneously. In other words, a camera can capture curvature information of an object from the sweeps of both lasers, in the same image or image frame, differentiated by colors. Thus, by using different wavelength lasers (of different colors), an optical camera can more efficiently collect data regarding an object by reading curvature information from two different lasers based on the same image or frame.

Figure 6:
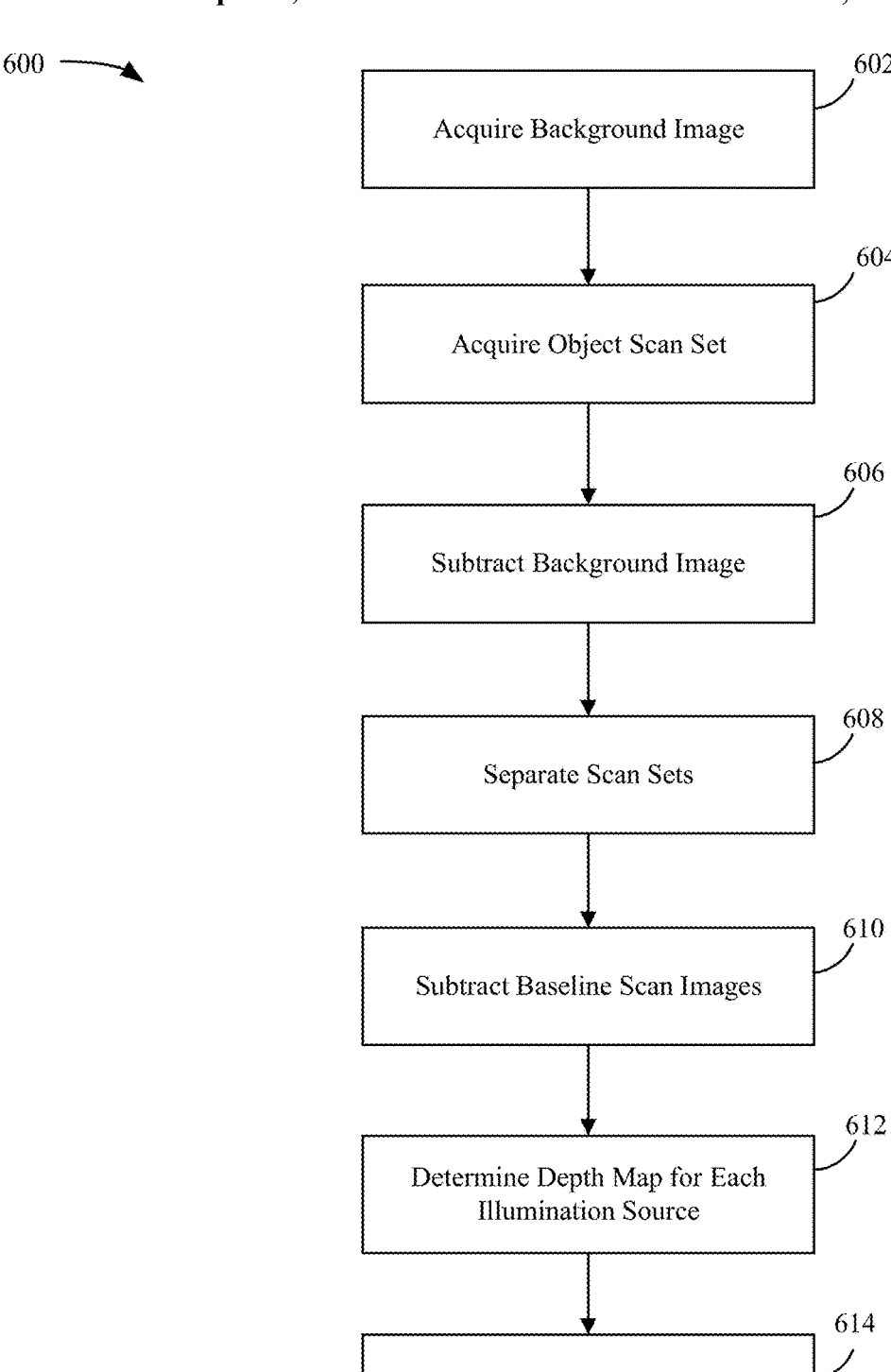
FIG. 6 illustrates a method for determining a depth map in accordance with an embodiment.

Referring to FIG. 6, a method for determining a depth map of object(s) 600 may comprise capturing a scan set of one or more object(s) 116 using a plurality of illumination sources 108, subtracting the respective baseline scan mask sets to determine a difference in the image coordinates of the projected illumination 110 as it intersects the object(s) 116, and determining the height of the object(s) 116 based on the difference in image coordinates. In some embodiments, the depth map determination method 600 may be implemented in the controller 112, for example, as operating routines stored in memory (e.g., as software). In some embodiments, the camera 102 may be triggered, for example by controller 112, to capture an image of the object(s) 116 on the surface at step 602 without any projected illumination 110 (a "background object image").

Figures 7A, 7B:
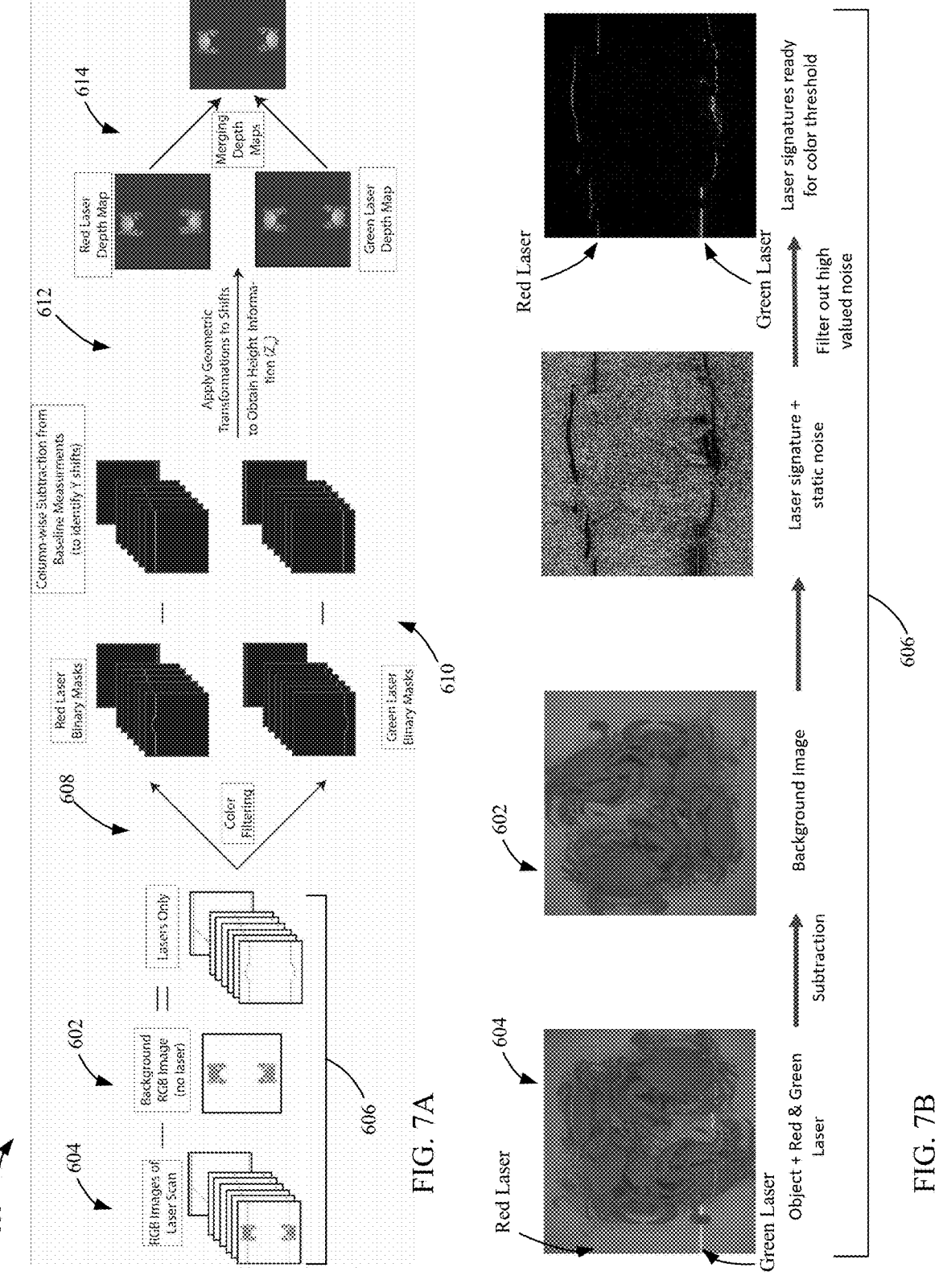
FIG. 7A diagrammatically illustrates a method of determining a depth map, in accordance with an embodiment.
FIG. 7B diagrammatically illustrates a portion of a method of determining a depth map, in accordance with an embodiment.

In some embodiments, each illumination source 108 has different spectrum or other distinction from the other illumination source(s) 108, for example a first illumination source 108 comprising a red laser and a second illumination source 108 comprising a green laser, which may facilitate separation of the imaged illumination projections 110 into separate sets of images in a later step. Reference is also made to FIG. 7A, which illustrates an exemplary embodiment of the method for determining a depth map 600 for the case of a plurality of objects (in this case, crabs) on a surface 114, scanned by red and green line lasers (e.g., the red laser scanning from top to bottom and the green laser scanning in the opposite direction).

In some embodiments, at step 604, the aimable illumination sources 108 may be controlled to project illumination 110 at each of their respective scan steps (for example in sequence from an illumination source's 108 first scan step to last scan step) and the camera 102 may be controlled to capture an image at each scan step. For example, the controller 112 may, for each scan step, control a plurality of aimable illumination sources 108 to simultaneously project their illumination (e.g., according to the scan step information determined in the illumination scan calibration method 400), and the controller 112 may trigger the camera 102 to capture an image. Thus the image may comprise the plurality of illumination projections 110 (at the respective scan step for each illumination source 108) intersecting the surface 114 and/or object(s) 116 present on the surface 114. The image may be referred to as a scan image. The image may be in any suitable format, for example in a RGB format. The plurality of images obtained from step 604, each at a different scan step, may be referred to as an "object scan set."

In some embodiments, the background object image from step 602 may be subtracted from each of the images of the object scan set, at step 606, to produce a set of images having the projected illuminations 110 (e.g., laser lines deformed by any objects 116 on the surface 114) as a major feature. The resulting image set may also have other artifacts, such as static noise, and some image processing may be performed (such as denoise, filtering, and the like) to remove the artifacts, leaving the projected illuminations 110. The resulting image set may be referred to as an "processed object scan set." FIG. 7B illustrates an exemplary embodiment of step 606 for the case of a pile of overlapping 3D-printed crabs on a surface 114, scanned by red and green line lasers during one of the scan steps, and shows the extraction of the laser line projections as deformed over the crabs.

In some embodiments, at step 608, the processed object scan set may be separated into a plurality of scan sets, each set associated with a particular illumination source 108 (each referred to herein as a "object scan mask set"). In an exemplary embodiment, the object scan set may be separated into an object scan mask set having only projected illumination 110 from a red laser and an object scan mask set having only projected illumination 110 from a green laser. The object scan set separation 608 may be performed using any suitable image processing techniques, for example color filtering based on the spectrum of each illumination source 108. Alterations in the captured spectrum, for example due to camera color calibration, interactions with the surface 114 and/or objects 116, ambient lighting, or the like, may be accounted for in the separation step 608. In some embodiments, object scan set separation 608 may comprise converting the object scan mask sets into a binary representation such as binary images having only two colors (e.g., black and white), one color representing the surface (or height=0) and the other color representing the projected illumination 110. For example, the object scan mask sets may use black to represent the surface 114 and white to represent the captured projected illumination 110. As described above, the baseline scan mask sets resulting from the baseline scan set acquisition method 500 may be similarly converted into a binary representation. In some embodiments, binary representations of the different mask sets facilitate the subtraction step described below.

In some embodiments, at step 610, for each of the object scan masks sets, the respective baseline scan mask set (for the same illumination source 108) may be subtracted from or otherwise compared to the object scan mask set, for each scan step, to create a "subtracted scan set." The subtraction or comparison identifies, for each illumination source 108, any pixel shifts in the projected illumination 110 captured in the respective object scan mask set as compared to the respective baseline scan mask set, for each scan step, the shift being due to the projected illumination 110 intersecting with object(s) 116.

In some embodiments, at step 612, a plurality of depth maps may be determined, each depth map associated with an illumination source 108. In some embodiments, each depth map may be configured to indicate the real-world height ($z_w$) at each position ($x_w$, $y_w$) in the FOV 114 or other defined subregion of the FOV 114. In some embodiments, the shifts in pixel position of the projected illumination 110 may be converted into a determination of the real-world height of an object 116 at a particular real-world coordinate according to Eq. 8 and Eq. 9 (and associated equations), as described above. In an exemplary embodiment, for each pixel shift in the projected illumination 110 (e.g., shift in the y-direction) in the image due to intersection of the projected illumination 110 with object(s) 116, the pixel shift can be converted to a real-world position shift (e.g., $\Delta y$) using Eq. 8 and associated equations. For example, Eq. 8 may be used to determine the real-world y-coordinate ($y_{wo}$) of the shifted pixel position, and may be used to determine the real-world y-coordinate ($y_{wb}$) of the baseline pixel position. During an optional calibration step, a baseline position of the laser line (i.e. $y_{wb}$) for each scan step can be captured and stored, e.g., as part of capturing the baseline scan set, for later use. This optional calibration step can be an offline process done during initial system setup. Eq. 9, using the determined $\Delta y$ and the angle $\theta$ (determined based on the particular scan step imaged) can then be used to determine the real-world object height, $z_{wo}$, at that particular position.

In some embodiments, each image of the scan sets described herein may comprise pixel columns defined as parallel to the direction of the illumination scan, for example oriented parallel to the image y-axis, and pixel rows perpendicular to the pixel columns. Thus, each pixel in the pixel column may share the same image x-coordinate value, and each pixel column has its own image x-coordinate value. In some embodiments, for each image in each subtracted scan set, and for each pixel column in each image, if information corresponding to the projected illumination 110 is present in the pixel column, for example a pixel having a value (e.g., white) other than the background value (e.g., black) or the baseline value, then a shift in the projected illumination 110, and thus intersection with an object 116, is indicated. If an object is indicated, then the real-world height ($z_{wo}$) and position ($x_{wo}$, $y_{wo}$) at the illuminated position may be determined as discussed above (e.g., $x_w$ determined from the pixel column, $y_w$ based on the shifted pixel position in the y-direction).

If no information corresponding to the projected illumination 110 is present or the information matches the baseline information for the projected illumination 110 after the subtraction step 610, then intersection with the surface 114—the baseline condition—is indicated. If no shift is detected then the baseline height (e.g., z=0) may be assigned to the respective depth map at the respective location (e.g., $x_w$ determined from the pixel column, $y_w$ determined based on the scan step or otherwise based on the baseline projected illumination 110 position).

In some embodiments, the arrangement of the object(s) 116 may create "dead spots," or regions that a particular projected illumination 110 cannot reach. For example, referring briefly to FIG. 3, the object 116 at $y_{wo}$ creates a region from $y_{wb}$ to $y_{wo}$ where the projected illumination 110-1 cannot reach the surface 114 or even some shorter objects 116 that also might exist in that region. In some embodiments, regions that are not illuminated by either laser are set to a depth value of zero. In practice, this only happens in deep pockets where there is an obstruction for both lasers. The subtraction step then subtracts the original RGB image from the rest of the laser images, to isolate the laser on its own. The result is the laser signature, which is important for depth reconstruction. All regions not illuminated by the laser would then be part of the black/blank background of the laser signature. In other embodiments, a depth map for an illumination source may be configured to indicate a lack of height information at those locations.

In some embodiments, a depth map may be determined 612 for a particular illumination source by combining the depth information determined as described above for each image in the respective object scan mask set. In some embodiments, the depth information may be combined by placing it into an array having a size corresponding to the image size. In some embodiments, the projected illumination 110 (in the baseline scan set, object scan set, etc.) may be captured by more than one pixel in a pixel column, for example by multiple adjacent pixels. In such a case, the center of the projected illumination may be determined and this coordinate used for assigning the determined height to the depth map. Step 612 may be performed for each object scan mask set to create a depth map associated with each illumination source.

Figure 7C:
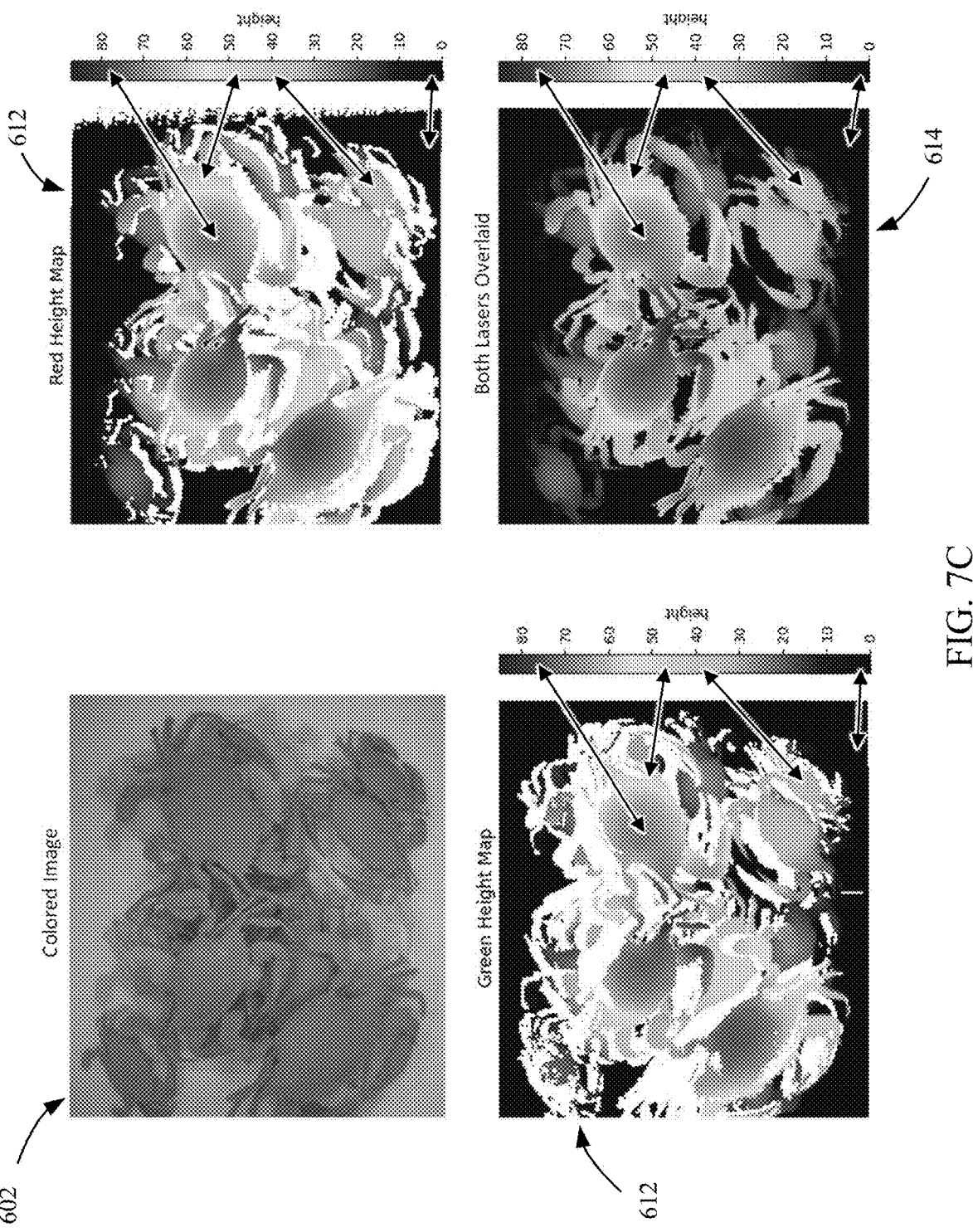
FIG. 7C illustrates the output of various steps of a method of determining a depth map, in accordance with an embodiment.

In some embodiments, the individual depth maps associated with each illumination source may then be merged to create a merged depth map at step 614. In some embodiments, if only one depth map contains a height for a particular position then that height will be used, if more than one depth map contains a height for a particular position then the mean (or average or other mathematical determination) of the height values may be used, and if no depth map has a height value for a particular location then the height may be set to zero at that particular location. FIG. 7C illustrates an exemplary embodiment of the output of steps 612 and 614 for the case of a pile of overlapping 3D-printed crabs on a surface scanned by red and green line lasers, showing individual and merged depth maps. Regions in each depth map that are missing height information, e.g., due to occlusion of the illumination source, are indicated as white. Depth maps may also be referred to as height maps. The depth maps and merged depth map may be stored in memory.

In some embodiments, separation of the masks into separate colors may not be used. For example, for each image in a scan set, a column-wise search for the projected illuminations 110 having different colors may be performed and then used as described above.

As described above, embodiments of the systems and methods described herein may be implemented in a processing line or other machine vision application. In some embodiments, the processing line may comprise a conveying system (e.g., conveyor belt, movable trays, or the like) having a surface on which one or more objects are carried, and a retrieval system configured to retrieve one or more of the objects from the conveying system. In some embodiments, the retrieval system may comprise a robotic picking system, for example one or more robotic picking arms with devices configured to temporarily grab or otherwise couple with one or more objects. In an embodiment, the robotic picking system may comprise a robotic arm having a soft claw-style actuator configured to pick up a crab or other food-related product.

In some embodiments, the machine vision system 100 may be mounted on a movable platform, vehicle, or the like, while the object(s) 116 to be scanned are kept relatively in place. For example, the machine vision system 100 may be mounted to a vehicle configured to move among fruit trees or bushes, to identify and facilitate picking of the fruit. In other embodiments, the system 100 may be mounted in various types of facilities for scanning poultry (e.g., broiler, meat chickens) for deboning or fish to fillet, such as to find the cut lines of the chicken or fish (or any part or parts of any other type of animal). In further embodiments, the system 100 may be utilized in other types of processing plants or processing operations where robotic operations may take place, such as in automated product packing for warehouses (e.g., packing consumer and/or non-consumer goods automatically for shipping) or manufacturing processes where robotic picking may take place. For example, in one embodiment, a bulk container of consumer goods may be presented for robotic picking and packaging—as described above, the system can utilize the scanning techniques of the present disclosure (e.g., the machine vision-guided loading method 800) to guided a robotic arm to pick individual goods from the bulk container, and place them for purposes of packing or other operations. Similarly, a pallet of boxes or other items arriving at a shipping dock can be positioned for viewing by a system 100, in order to guide a robotic arm to break down the pallet and remove the boxes/items to be routed for their purposes within the facility. Similarly, in a mail or parcel sorting operating, bulk mail containers can be viewed by the system 100 to identify non-conforming package sizes/shapes for removal from a processing line.

Figure 8:
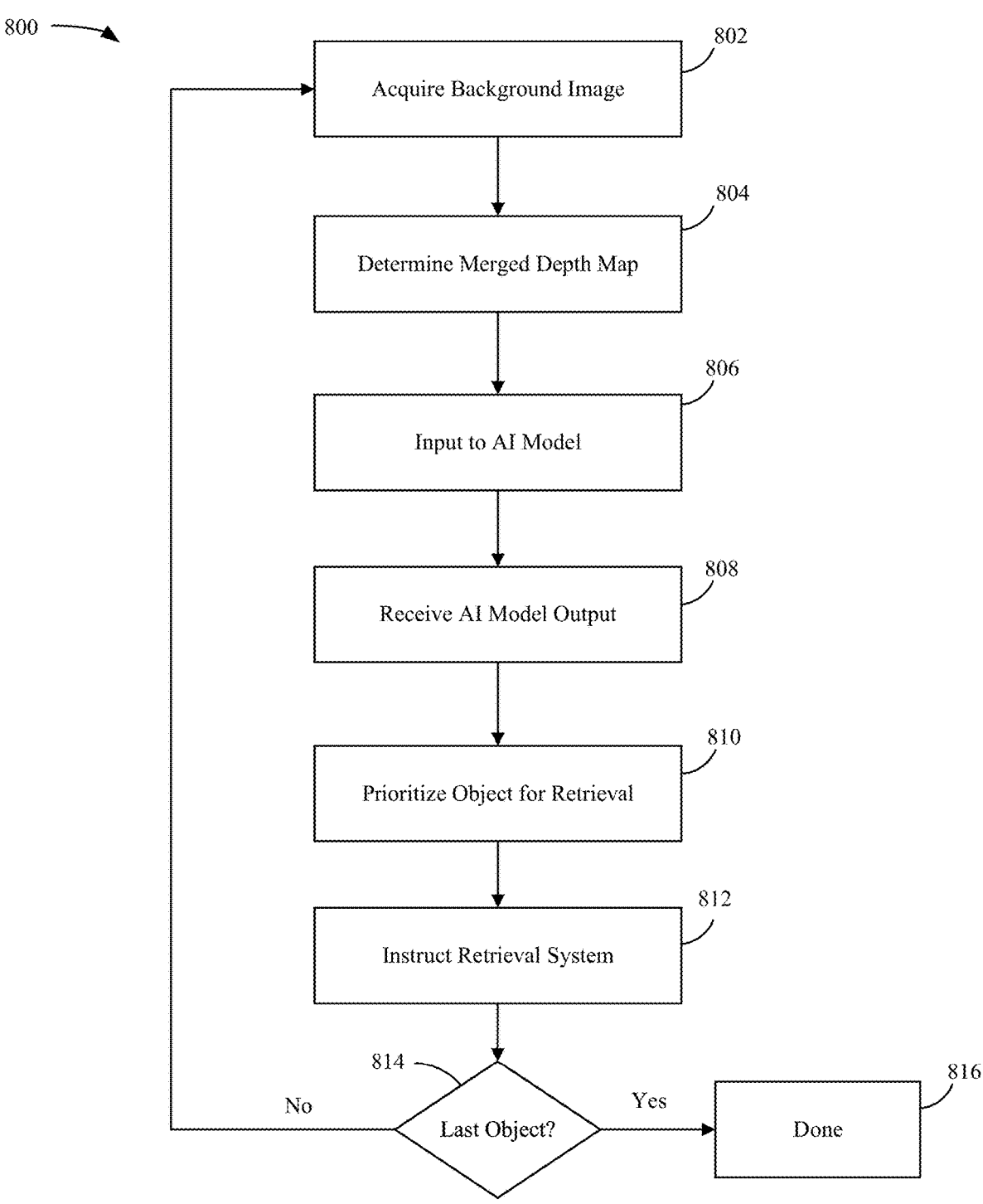
FIG. 8 illustrates a method for machine vision-guided robotic loading in accordance with an embodiment.

In some embodiments, the conveying system may move object(s) 116 into the machine vision system 100, such that the object(s) 116 are within the field of view of the camera 102 and capable of being illuminated by one or more illumination sources 108. Referring to FIG. 8, a method for machine vision-guided loading 800 may comprise acquiring a background image 802 and determining a merged depth map of the object(s) 804, for example according to the method for determining a depth map 600 of FIG. 6. In some embodiments, the machine vision-guided loading method 800 may be implemented in the controller 112, for example, as operating routines stored in memory (e.g., as software).

Figure 10B:
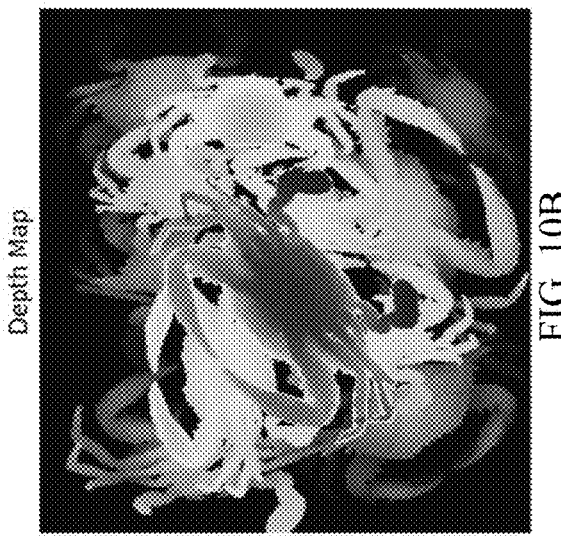
FIG. 10B illustrates an example merged depth map for input to a machine learning model in accordance with an embodiment.
Figure 10D:
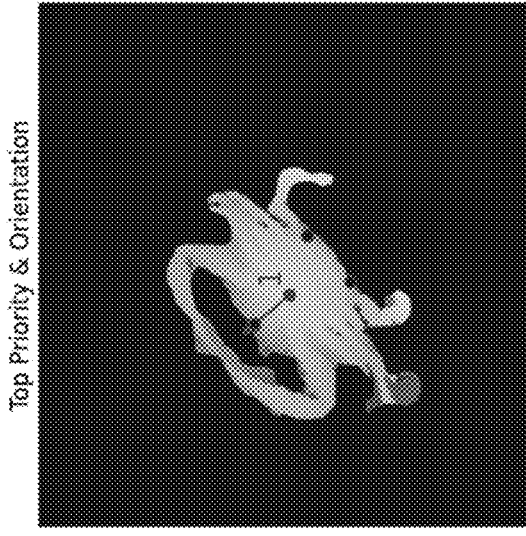
FIG. 10D illustrates an example prioritized object identification in accordance with an embodiment.
Figure 10A:
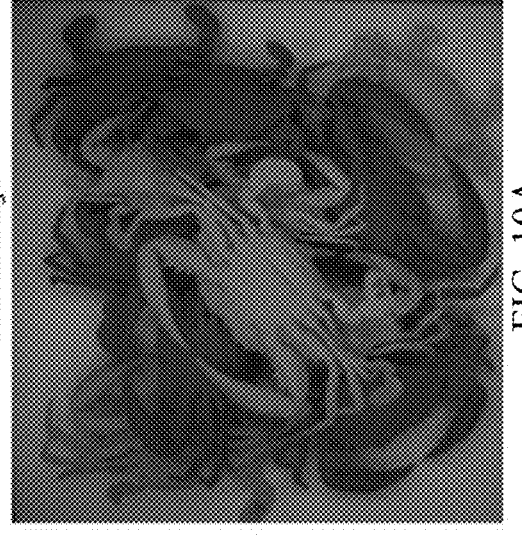
FIG. 10A illustrates an example background image for input to a machine learning model in accordance with an embodiment.

While acquiring the background image 802 and object scan set, the machine vision system 100 may instruct the retrieval system to move out of the field of view of the camera 102 and/or illumination sources 108, so as not to interfere with the various imaging and illumination processes. The background image and merged depth map (whether separate or combined in any suitable format such as RGB-D) may then be input to a trained machine learning (ML) model at step 806, wherein the ML model has been trained to output, at step 808, information to identify the object(s) 116 to be acquired by the retrieval system. FIGS. 10A and 10B illustrate an exemplary background image and merged depth map that may be input to the ML model.

Figure 9:
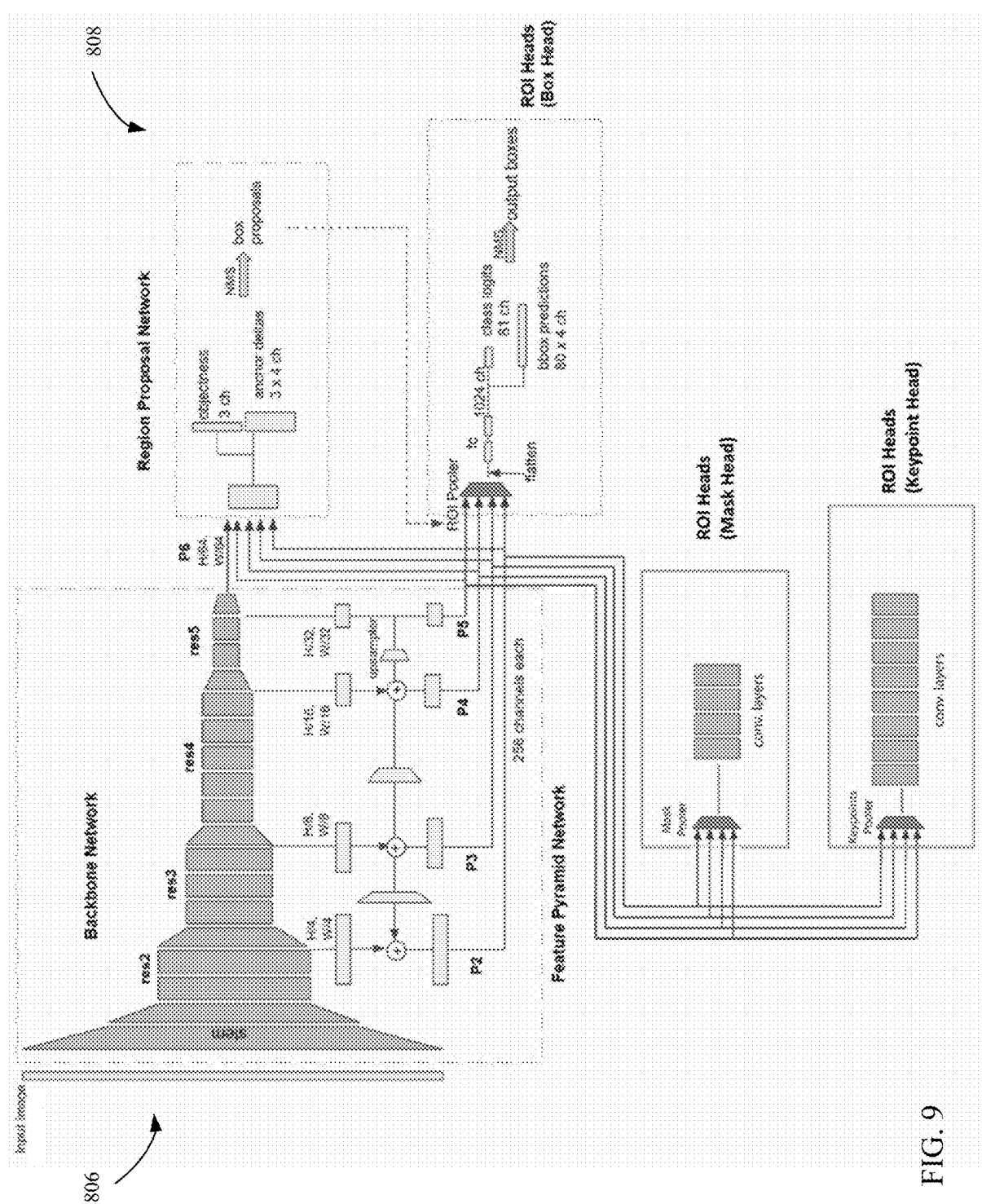
FIG. 9 illustrates a machine learning model in accordance with an embodiment.

The ML model may comprise any suitable ML model for identifying object(s) 116 based on the information determined by the machine vision system 100 and input into the ML model as described above. In some embodiments, the trained ML model may comprise a convolutional neural network (CNN). For example, referring briefly to FIG. 9, the ML model may comprise a Mask R-CNN with a ResNet-101/FPN backbone with box, mask, and keypoint heads. The ML model may discretize (e.g., identify) individual objects. In some embodiments, the ML model may output 808 the class, bounding box, mask, and key points for each object identified by the ML model. Each individual object 116 identified by the ML model may be referred to as an instance. In some embodiments, variations of the Mask R-CNN network may be used, such as ResNeXt, ResNet-50, ResNet-151, and the like. In some embodiments, semantic segmentation models may be used, for example targeting RGB-D learnings where the depth features are extracted and learned independently of the colored image.

In other embodiments, the model to be used can be configured/trained to perform instance-level segmentation—in other words, such a model is capable of detecting the instance (e.g., crab) masks, keypoints, and classes but also discriminating between one instance and another. The model can thus detect various sizes of instances such as crabs because the FPN accounts for different feature resolutions.

Figure 10C:
FIG. 10C illustrates an example output from a machine learning model in accordance with an embodiment.

The class of an object 116 may identify its orientation (e.g., right-side up or upside down), type of object, color, and/or other feature(s) trained into the ML model. In an exemplary embodiment, the class may indicate a crab that is belly-up or belly-down. In some embodiments, the center of an object 116 may be determined from its bounding box, for example by determining the center point of the bounding box. In some embodiments, the center of an object 116 may be determined based on the key points, for example the geometric center of the key points. In some embodiments, the mask may identify the region occupied by the identified object 116. In some embodiments, the key points may identify predetermined key points on an object, for example points that help identify the orientation or directionality of the object 116, places to pick up the object 116, or the like. For example, in an embodiment where the objects 116 are crabs, the key points may identify the front center, rear left, and rear right of each crab instance. FIG. 10C illustrates exemplary ML model output based on the input of FIGS. 10A (colored image) and 10B (merged depth map), the output including identified bounding boxes, class ("belly_down" and "belly_up"), key points (illustrated as the endpoints of the lines from rear left/rear right to front center), and object masks.

In some embodiments, the output 808 of the ML model may be used to prioritize, at step 810, one or more objects 116 for retrieval by the retrieval system. In some embodiments, objects 116 having a greater height, for example on top of a pile of objects, may be prioritized for retrieval. In some embodiments, each object mask may be used to identify all points on the merged depth map belonging to a single instance (e.g., a single object). The height of each object may then be determined according to the height of various points of the object 116. For example, in some embodiments, the height of each point of the object 116 may be averaged to determine an average height for the object 116. Each object 116 may then be rank ordered according to average height. In some embodiments, objects may be prioritized based on object class. In an embodiment, crabs that are belly-down are prioritized over crabs that are belly-up. Other suitable factors or combination of factors may be used to prioritize retrieval, such as overlapping or non-overlapping objects (e.g., based on bounding box or object mask), object size (e.g. based on bounding box or object mask), directionality (e.g., based on key points), or the like. For example, FIG. 10D illustrates an exemplary prioritized object (crab) with identified key points and orientation.

In some embodiments, the retrieval system may be instructed to retrieve one or more objects 116 at step 812. In some embodiments, instructing the retrieval system 812 may comprise providing a determined center point of the object(s) 116 to be retrieved, for example determined from the bounding box output by the ML model. In some embodiments, instructing the retrieval system 812 may comprise providing an orientation of the object(s) 116 to be retrieved, for example determined from the key points output by the ML model. In some embodiments, instructing the retrieval system 812 may comprise providing the class of the object(s) 116 to be retrieved. In some embodiments, instructing the retrieval system 812 may comprise providing the center point and directionality of the object 116 having highest priority to a robotic picking system. The retrieval system may then retrieve the identified object(s) 116.

After the object(s) 116 are retrieved, they may be placed in any other suitable location, such as a package, another conveying system, a disposal system, or the like. In some embodiments, the retrieval system may be instructed 812 to retrieve the next object(s) 116, for example based on the prioritization determined at step 810. However, in some cases, the collection of objects 116 on the surface may be disturbed and shift or otherwise be changed after a retrieval operation. Thus, in some embodiments, a check is performed at step 814 to determine if any object(s) 116 remain on the surface, and if so, the object(s) 116 may be reimaged 602 and a new merged depth map determined 614 before repeating steps 806 to 812. Once all objects 116 have been retrieved, as checked by step 814, the method for machine vision-guided loading 800 may be completed at step 816. In some embodiments, this may trigger the conveying system to move a new collection of objects into the machine vision system 100, and the method for vision-guided loading 800 may be executed again.

Advantageously, with a sufficiently fast camera (e.g., 500 frames-per-second) and illumination source 108 actuator (or motor or the like), and depending on the number of scan steps (e.g., 350), in some embodiments it may take less than a second to: image, scan, and determine a merged depth map for the objects 600, execute the ML model and receive its output 808, prioritize object(s) for retrieval 810, and instruct the retrieval system 812. Thus systems and methods according to various embodiments may provide fast processing of objects.

As described above, in some embodiments, the controller 112 may use an object detection machine learning (ML) model at step 806, for example based on a machine learning algorithm (e.g., such as a deep learning algorithm), to perform object determination, recognize morphological features of objects, generate coordinates for robotic picking and loading, or the like. As used herein, a ML algorithm may comprise a procedure run on a training data set to create a ML model, and a ML model is configured to receive new input data and generate an estimation, prediction, classification, or the like for the new input data. An ML model may also be referred to as an AI (artificial intelligence) model.

The object detection ML model may be stored in the memory of the controller 112. The controller 112 processing circuitry may execute operating routines including the object detection ML model, and may generate an output based on one or more of the received inputs from step 806. In some embodiments, the object detection ML model may comprise any suitable ML model for image classification, for example object recognition.

The ML algorithm(s) for the ML models discussed above may be implemented on any suitable computing system. In some embodiments, the controller 112 may be configured to perform the ML algorithm. In some embodiments, a separate computing device may be configured to perform the ML algorithm. The ML algorithm may be configured to construct a ML model based on the training data set. The training data set may comprise example inputs and their actual outputs (e.g., classification). The generated ML model can map the inputs to the outputs based on the provided training set. The ML model may be updated over time, for example as the training data set becomes larger, is improved, or is otherwise updated. In some embodiments, the controller 112 may be provided with the updated ML model(s) from time to time.

The ML algorithm may be configured to perform machine learning using various methods, such as decision tree learning, associates rule learning, artificial neural networks, convolutional neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others.

As described above, the ML algorithm is configured to perform a particular task, for example training a ML model to identify specified objects, predetermined key points on the object, class of object, bounding box for the object, mask for the object, or the like. The task for which the ML model is trained may vary based on, for example, the type of object 116, the type of camera 102 output available to the ML model, the type and number of illumination sources 108, ambient lighting conditions at the intended location of use, the type of surface 114, the relative and/or absolute locations of the illumination sources 108 with respect to the camera 102, and so on.

In some embodiments, the training data set may comprise pre-labeled or pre-identified instances for masks, key points, class, and the like. The training data set may comprise both an image (e.g., colored image) and depth maps. Some of the training data set may be used to train the ML model, and the remaining training data set may be used to test the ML model. In an exemplary embodiment, the training data set may comprise 2000 instances of objects each labeled with masks, key points (e.g., front center, rear right, and rear left of a crab), and class (e.g., belly-up or belly-down for a crab), and may have varying levels of difficulty such as an individual object, multiple non-overlapping objects, and multiple overlapping (e.g., piled) objects. In this exemplary embodiment, 1700 instances may be used to train the ML model, and 300 instances may be used for testing. In some embodiments, a training set may include RGB images and depth maps. The RGB images only can be labeled, or both the RGB images and depth maps can be labeled. In implementations where only one image is labeled, the label can essentially be transferred to the other image, based upon a direct spatial fit between the depth map and the RGB location. In other words, some embodiments can be configured to superimpose the "label" location from the RGB image to the depth map. Furthermore, in circumstances when it is difficult to tell whether sub-sections of the instance are above/below other subsections (i.e. crab legs from one instance are above/below crab legs from another instance and how they intertwine) the system can consult the depth map by superimposing a jet colored depth map with high transparency, that way a reviewer (whether a human reviewer or automated system) can get visual information from the RGB image and depth map in the labeling efforts.

An experiment was performed using Chesapeake Blue Crabs. Crabs have asymmetric morphology with significant size variations and uneven surfaces. Using a dual line-laser machine vision system 100 setup according to FIG. 1, the system was able to obtain an absolute depth accuracy within 0.024 mm and a standard deviation of 0.104 mm. The system was able to reliably detect and segment Chesapeake Blue Crab.

It will be appreciated by those skilled in the art that while the disclosed subject matter has been described above in connection with particular embodiments and examples, the present disclosure and the claims of the present disclosure are not necessarily so limited, and that numerous other embodiments, process flows and step ordering, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the various aspects presented in the present disclosure are set forth in the following claims.

The invention claimed is:

1. A system for detecting an object on a surface, comprising:
    a camera oriented to include the surface in a field-of-view (FOV) of the camera;
    a plurality of aimable illumination sources configured to project corresponding illuminations toward the surface within the FOV of the camera; and
    a controller comprising a processor that is configured:
        to control the camera to capture, with the camera, a first background image of the object on the surface;
        to control the plurality of aimable illumination sources to project the corresponding illuminations simultaneously toward the surface to form a projected illumination on the surface;
        to control the camera to capture a scan image comprising the projected illumination formed by simultaneously projected corresponding illuminations that intersect the surface at respective positions;
        to determine a first depth map based on separating the scan image into a plurality of object scan mask sets, each object scan mask set representing a corresponding image formed only by an illumination of an aimable illumination source chosen from the plurality of aimable illumination sources;
        to provide the first depth map and the first background image to a trained machine learning model executed by the processor; and
        to receive an output from the machine learning model, wherein the output comprises information associated with the object;
    wherein the plurality of aimable illumination sources comprises a first aimable illumination source and a second aimable illumination source, and wherein the first aimable illumination source and the second aimable illumination source have different spectra, and
    wherein the controller is further configured to separate the scan image into the plurality of scan image sets each of which is formed only by light having a spectrum of an illumination of said aimable illumination source chosen from the plurality of aimable illumination sources.

2. The system of claim 1, wherein each of the aimable illumination sources comprises a line laser.

3. The system of claim 2, wherein each of the aimable illumination sources further comprises:
    a motor; and
    a mirror coupled to the motor,
    wherein the mirror is positioned to reflect illumination from the line laser;

wherein the motor is controllable to rotate the mirror based on a received control input.

4. The system of claim 1, wherein the controller is further configured:
    to controllably scan the projected illumination across the surface within the FOV in a plurality of scan steps by changing a position of a corresponding illumination of each of the plurality of aimable illumination sources on the surface;
    to determine an object scan set, comprising a plurality of scan image sets, at each scan step of the plurality of scan steps; and
    to determine the first depth map based on the object scan set.

5. The system of claim 4, wherein the controller is further configured:
    to determine a baseline scan set for each of the plurality of aimable illumination sources; and
    to determine the first depth map based on the object scan set by subtracting, pixel by pixel, the baseline scan set from the object scan set to identify a pixel shift in the projected illumination captured in a given object scan mask set as compared to a corresponding baseline scan mask set, for each scan step, wherein the shift is due to the projected illumination intersecting with the object.

6. The system of claim 1, wherein the controller is further configured to control a robotic picking device to acquire the object according to the output of the machine learning model.

7. The system of claim 1, wherein the controller is further configured:
    to determine, based on the output of the machine learning model, a first object among a plurality of objects to prioritize; and
    to provide a first signal to a robotic picking device to aid in acquiring the first object.

8. The system of claim 7, wherein the controller is further configured, after the first object has been removed from the surface:
    to provide a second depth map and a second background image to the machine learning model;
    to receive a second output from the machine learning model and, based on the second output, determine a second object among the plurality of objects to prioritize; and
    to provide a second signal to the robotic picking device to aid in acquiring the second object.

9. The system of claim 1, wherein the machine learning model is configured:
    to identify the object; and
    wherein the information associated with the object comprises at least one of a mask, a key a point, a class, and a bounding box for the object identified by the machine learning model.

10. A method for detecting an object, the method comprising:
    capturing, with a camera, a first background image of the object on a surface that is positioned in a field-of-view (FOV) of the camera;
    controlling a plurality of aimable illumination sources to simultaneously project corresponding illuminations toward the surface within the FOV of the camera to form a projected illumination on the surface;
    capturing, with the camera, a scan image comprising the projected illumination formed by simultaneously projected corresponding illuminations that intersect the surface at respective positions;

determining a first depth map based on separating the scan image into plurality of object scan mask sets, each object scan mask set representing a corresponding image formed only by an illumination of an aimable illumination source chosen from the plurality of aimable illumination sources; providing the first depth map and the first background image to a machine learning model; and receiving an output from the machine learning model, wherein the output comprises information associated with the object, wherein the plurality of aimable illumination sources comprises a first aimable illumination source and a second aimable illumination source, and wherein the first aimable illumination source and the second aimable illumination source have different spectra, and wherein the controller is configured to separate the scan image into the plurality of scan image sets each of which is formed only by light having a spectrum of an illumination of said aimable illumination source chosen from the plurality of aimable illumination sources.

11. The method of claim 10, wherein each of the aimable illumination sources comprises a line laser.

12. The method of claim 11, wherein each of the aimable illumination sources further comprises:

a motor; and a mirror coupled to the motor and positioned to reflect illumination from the line laser; and wherein the controlling the plurality of aimable illumination sources comprises providing a control input to the motor of each aimable illumination source.

13. The method of claim 10, wherein the method further comprises:

controllably scanning the projected illumination across the surface within the FOV in a plurality of scan steps by changing a position, on the surface, of the corresponding illumination of an aimable illumination source of the plurality of aimable illumination sources, determining an object scan set, comprising a plurality of scan image sets, at each scan step of the plurality of scan steps, and determining the first depth map based on the object scan set.

14. The method of claim 13, wherein the method further comprises:

determining a baseline scan set for each of the plurality of aimable illumination sources; and wherein the determining the first depth map based on the object scan set comprises subtracting, pixel by pixel, the baseline scan set from the object scan set to identify a pixel shift in the projected illumination captured in a given object scan mask set as compared to a corresponding baseline scan mask set, for each scan step, wherein the shift is due to the projected illumination intersecting with the object.

15. The method of claim 10, wherein the method further comprises generating a control signal for a robotic picking device to acquire the object according to the output of the machine learning model.

16. The method of claim 10, wherein the method further comprises:

determining, based on the output of the machine learning model, a first object among a plurality of objects on the surface to prioritize; and controlling a robotic picking device to acquire the first object.

17. The method of claim 16, wherein the method further comprises determining a second object among the plurality of objects to prioritize, after the first object has been removed from the surface.

18. The method of claim 10, wherein the machine learning model is configured to identify the object; and wherein the information associated with the object comprises at least one of a mask, a key point, a class, and a bounding box for the object identified by the machine learning model.

19. A system for detecting an object on a surface, comprising:

a camera oriented to include the surface in a field-of-view (FOV) of the camera;

a plurality of aimable illumination sources configured to project corresponding illuminations toward the surface within the FOV of the camera; and a controller comprising a processor that is configured:

to control the camera to capture, with the camera, a first background image of the object on the surface;

to control the plurality of aimable illumination sources to project the corresponding illuminations simultaneously toward the surface to form a projected illumination on the surface;

to control the camera to capture a scan image comprising the projected illumination formed by simultaneously projected corresponding illuminations that intersect the surface at respective positions;

to determine a first depth map based on separating the scan image into a plurality of object scan mask sets, each object scan mask set representing an image formed only by an illumination of an aimable illumination source chosen from the plurality of aimable illumination sources;

to provide the first depth map and the first background image to a trained machine learning model executed by the processor; and to receive an output from the machine learning model, wherein the output comprises information associated with the object;

wherein the controller is further configured:

to controllably scan the projected illumination across the surface within the FOV in a plurality of scan steps by changing a position of the corresponding illumination of each of the plurality aimable illumination source on the surface;

to determine an object scan set, comprising a plurality of scan image sets, at each scan step of the plurality of scan steps; and to determine the first depth map based on the object scan set.

20. The system of claim 19, wherein the machine learning model is configured:

to identify the object; and wherein the information associated with the object comprises at least one of a mask, a key point, a class, and a bounding box for the object identified by the machine learning model.

* * * * *